US011121796B2

(12) United States Patent
Akiyama

(10) Patent No.: US 11,121,796 B2
(45) Date of Patent: Sep. 14, 2021

(54) OPTICAL ADD-DROP DEVICE

(71) Applicants: FUJITSU LIMITED, Kawasaki (JP); Photonics Electronics Technology Research Association, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 16/885,994

(22) Filed: May 28, 2020

(65) Prior Publication Data

US 2020/0389247 A1    Dec. 10, 2020

(30) Foreign Application Priority Data

Jun. 10, 2019    (JP) .............................. JP2019-107786

(51) Int. Cl.
*H04J 14/02*    (2006.01)
(52) U.S. Cl.
CPC ................................. *H04J 14/021* (2013.01)
(58) Field of Classification Search
CPC . H04J 14/021; H04J 14/0204; H04Q 11/0067
See application file for complete search history.

(56) References Cited

U.S. PATENT DOCUMENTS

| 6,477,288 B1* | 11/2002 | Sato | H04J 14/0283 385/16 |
| 8,175,458 B2* | 5/2012 | Way | H04J 14/0232 398/72 |
| 2011/0081146 A1* | 4/2011 | Nakajima | H04J 14/0204 398/48 |
| 2017/0187483 A1* | 6/2017 | Mansouri Rad | H04J 14/0206 |

FOREIGN PATENT DOCUMENTS

| JP | 2004-109214 | 4/2004 |
| JP | 2011-82749 | 4/2011 |

* cited by examiner

*Primary Examiner* — Dzung D Tran
(74) *Attorney, Agent, or Firm* — Staas & Halsey LLP

(57) ABSTRACT

An optical add-drop device includes optical circuits. Each of the optical circuits includes first to third sub optical circuits. Each sub optical circuit includes an input coupler, output coupler, and a phase shifter. In each of the optical circuit, two ports of the output coupler in the first sub optical circuit are respectively coupled to the input coupler in the second sub optical circuit and the input coupler in the third sub optical circuit. The output coupler in the second sub optical circuit in each of the optical circuits is coupled to a drop port or the input coupler in the first sub optical circuit in the adjacent optical circuit. The input coupler in the third sub optical circuit in each of the optical circuits is coupled to an add port or the output coupler in the third sub optical circuit in the adjacent optical circuit.

14 Claims, 18 Drawing Sheets

INPUT PORT P1

OUTPUT PORT P2

OUTPUT PORT P3

INPUT PORT P1

OUTPUT PORT P2

OUTPUT PORT P3

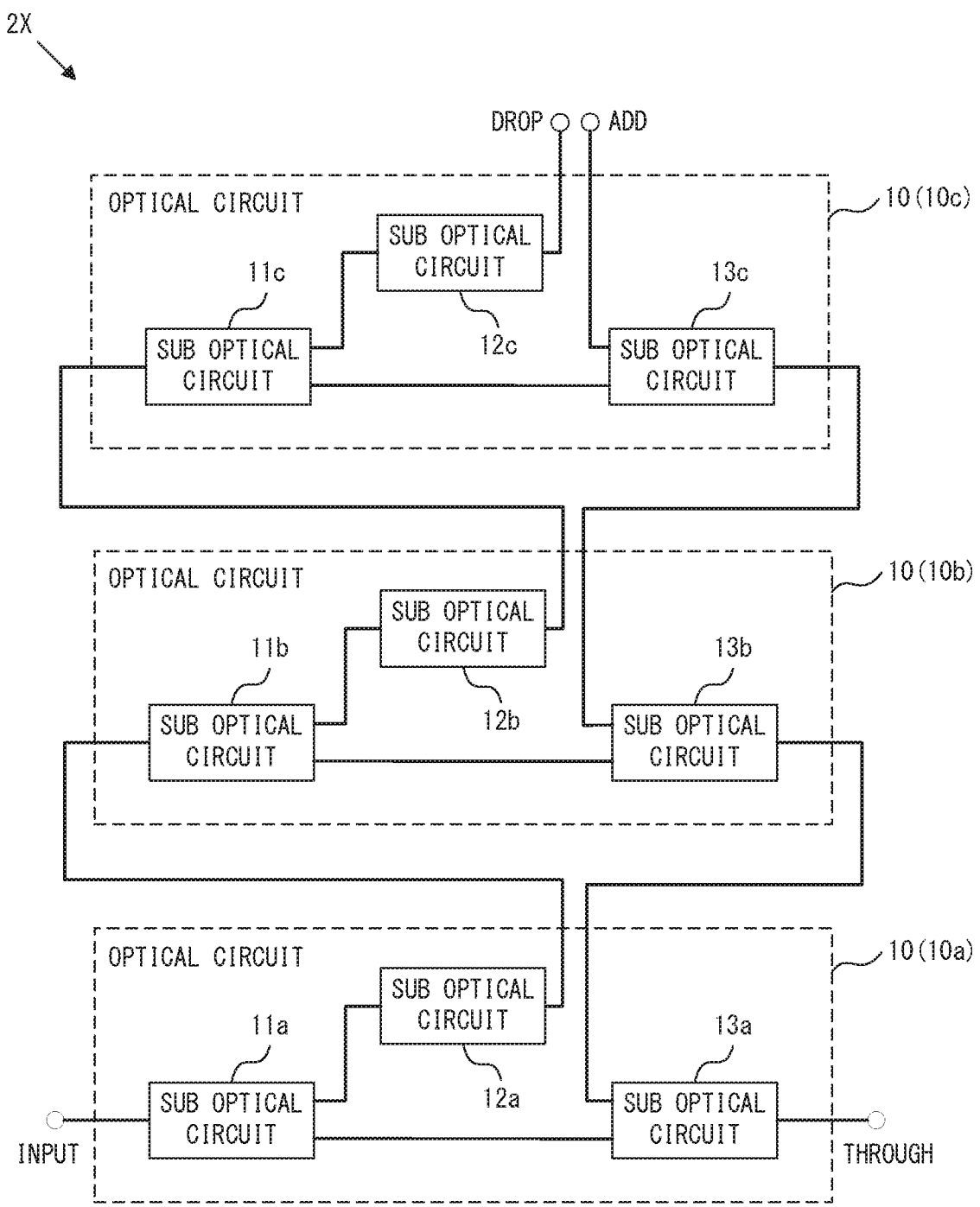
F I G. 13

OPTICAL ADD-DROP DEVICE

CROSS-REFERENCE TO RELATED APPLICATION

This application is based upon and claims the benefit of priority of the prior Japanese Patent Application No. 2019-107786, filed on Jun. 10, 2019, the entire contents of which are incorporated herein by reference.

FIELD

The embodiments discussed herein are related to an optical add-drop device used in a wavelength division multiplexing system.

BACKGROUND

The performance of an information processing system that includes a plurality of calculators is dependent on the speed of each calculator and the rate of transmissions between the calculators. The speeds of calculators have been enhanced owing to scaling based on micromachining of silicon integrated circuits. For the rates of transmissions between calculators, researches have been carried out on configurations in which calculators are connected by optical fibers so as to perform wavelength division multiplexing (WDM) transmissions. In this case, an optical add-drop device may be implemented in each calculator. The optical add-drop device can drop an optical signal of a designated wavelength from a WDM signal and add an optical signal to an available wavelength channel.

FIG. 1 illustrates an example of a conventional optical add-drop device. This optical add-drop device includes distributed Bragg reflectors (DBRs). The DBR depicted in FIG. 1, which is an example of a wavelength filter, reflects light of wavelength $\lambda i$ and transmits other frequency components. Thus, when an input WDM signal includes wavelengths $\lambda 1$ to $\lambda N$, light of wavelength $\lambda i$ is reflected by the DBR and guided to a drop port, and the other frequency components pass the DBR and are guided to a through port. Meanwhile, light of wavelength $\lambda ia$ is input through an add port. In this example, wavelengths $\lambda i$ and $\lambda ia$ are substantially the same. In this case, light of wavelength $\lambda ia$ is reflected by the DBR and guided to the through port. Accordingly, the optical add-drop device depicted in FIG. 1 may drop light of wavelength $\lambda i$ from the WDM signal and add light of wavelength $\lambda ia$ to the WDM signal.

A proposed optical device is capable of changing a wavelength to be added or dropped on an as-needed basis (e.g., Japanese Laid-open Patent Publication No. 2004-109214). A proposed wavelength monitoring device is capable of accommodating aging degradation (e.g., Japanese Laid-open Patent Publication No. 2011-082749).

The center wavelength of a wavelength filter (DBR in FIG. 1) provided in an optical add-drop device may have a production error and is dependent on temperature. Thus, the center frequency (the reflection wavelength of the DBR in FIG. 1) of the wavelength filter may be offset from a target frequency ($\lambda i$ or $\lambda ia$ in FIG. 1). If the center frequency of the wavelength filter is offset from the target wavelength, a loss of a dropped or added optical signal may be increased, and crosstalk between the wavelength channels may occur. Thus, the quality of the WDM signal may be deteriorated.

Such a problem may be solved or reduced by producing the optical add-drop device in an accurate manufacturing process. However, using an accurate manufacturing process will increase the cost of production of the optical add-drop device.

SUMMARY

According to an aspect of the embodiments, an optical add-drop device includes one or more optical circuits. Each of the one or more optical circuits includes a first sub optical circuit, a second sub optical circuit, and a third sub optical circuit. Each of the first sub optical circuit, the second sub optical circuit and the third sub optical circuit includes an input coupler, an output coupler, and a phase shifter implemented between the input coupler and the output coupler. In each of the one or more optical circuits, a first port of the output coupler in the first sub optical circuit is optically coupled to the input coupler in the second sub optical circuit, a second port of the output coupler in the first sub optical circuit is optically coupled to a second port of the input coupler in the third sub optical circuit, the output coupler in the second sub optical circuit is optically coupled to an output port of the optical circuit, a first port of the input coupler in the third sub optical circuit is optically coupled to an input port of the optical circuit, a wavelength channel in a wavelength division multiplexed (WDM) signal that is input to the first sub optical circuit is guided to the output port of the optical circuit via the second sub optical circuit, and another wavelength channel in the WDM signal is guided to the third sub optical circuit, and the third sub optical circuit combines the other wavelength channel that is guided from the first sub optical circuit and a wavelength channel that is guided from the input port of the optical circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an example of an optical add-drop device that processes an eight-wavelength WDM signal;

DESCRIPTION OF EMBODIMENTS

Figure 1:
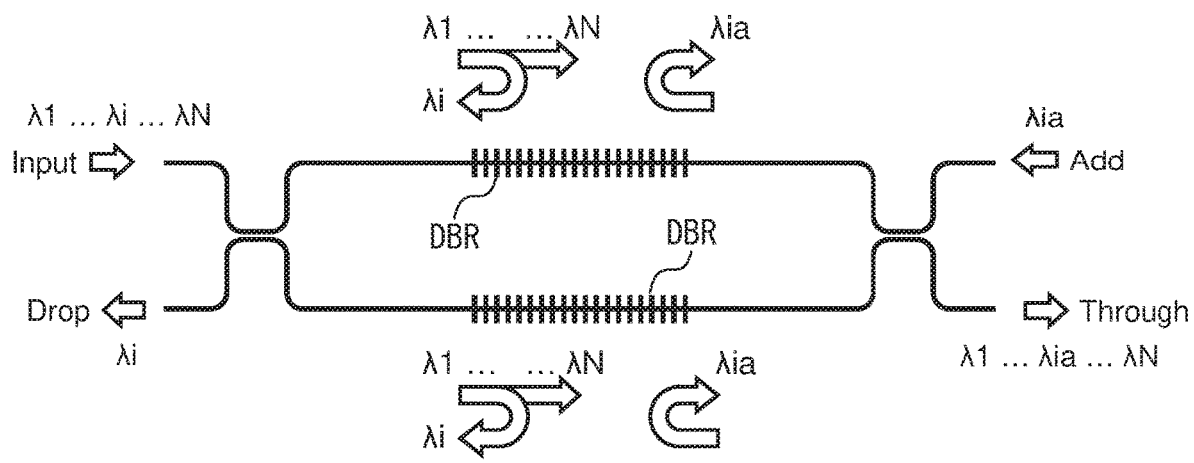
FIG. 1 illustrates an example of a conventional optical add-drop device.
Figure 2:
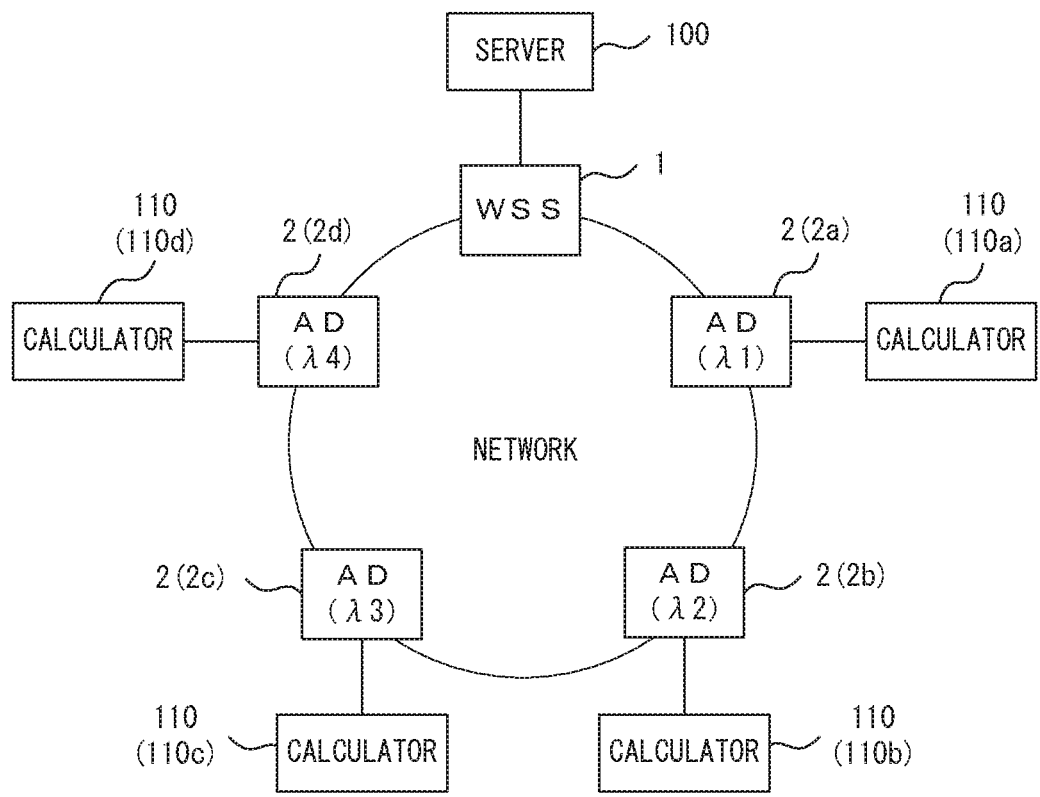
FIG. 2 illustrates an example of an information processing system in which optical add-drop devices are used.

FIG. 2 illustrates an example of an information processing system in which optical add-drop devices in accordance with embodiments of the invention are used. The information processing system includes a server 100 and a plurality of calculators 110 (110a-110d). The server 100 is connected to a network via a wavelength selective switch (WSS) 1. The calculators 110a-110d are respectively connected to the network via optical add-drop devices (ADs) 2a-2d. The network carries WDM signals. A WDM signal includes wavelength channels λ1-λ4. The wavelength channels λ1-λ4 are arranged at constant wavelength spacing (or constant frequency spacing). Note that an optical signal that is carried via a wavelength channel λi (i=1 to 4) may hereinafter be referred to as an "optical signal λi". The calculator 110 and the optical add-drop device 2 connected to the calculators 110 form an information processing device.

The wavelength selective switch 1 can drop an optical signal of a desired wavelength from a WDM signal and guide this optical signal to the server 100. In addition, the wavelength selective switch 1 can add an optical signal generated by the server 100 to a WDM signal.

The optical add-drop device 2a can drop an optical signal λ1 from a WDM signal and guide this optical signal to the calculator 110a. In addition, the optical add-drop device 2a can add an optical signal λ1 generated by the calculator 110a to a WDM signal. Similarly, the optical add-drop devices 2b-2d may each process an optical signal of a corresponding wavelength.

In the information processing system, the server 100 can send signals to desired ones of the calculators 110a-110d. For example, when sending a signal to the calculator 110a, the server 100 may generate a down-link optical signal λ1. Then, the wavelength selective switch 1 adds the down-link optical signal λ1 to a WDM signal. The optical add-drop device 2a drops the down-link optical signal λ1 from the WDM signal and guides the dropped signal to the calculator 110a. Each of the calculators 110a-110d may send a signal to the server 100. For example, when sending a signal to the server 100, the calculator 110a may generate an up-link optical signal λ1. Then, the optical add-drop device 2a adds the up-link optical signal λ1 to a WDM signal. The wavelength selective switch 1 drops the up-link optical signal λ1 from the WDM signal and guides this optical signal to the server 100.

Figure 3:
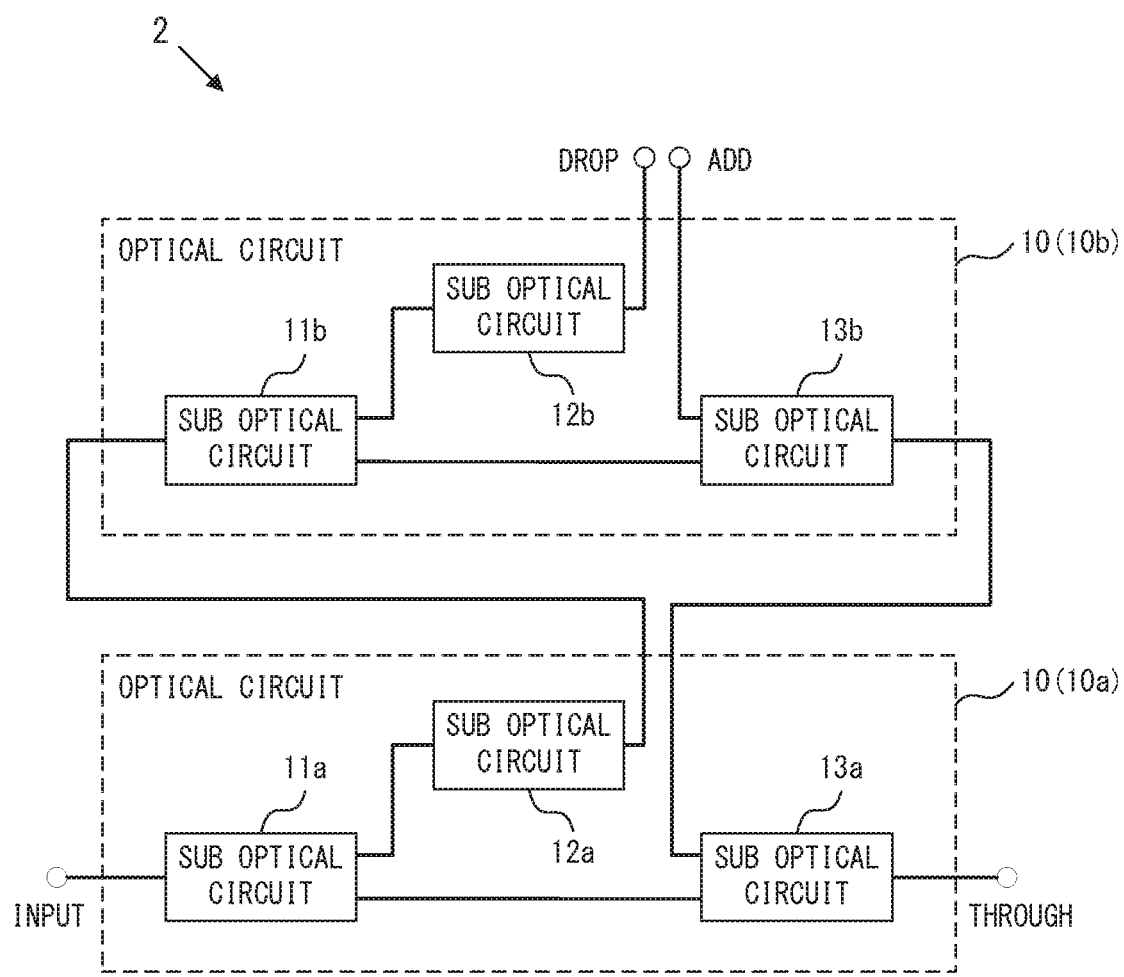
FIG. 3 illustrates an example of an optical add-drop device.

FIG. 3 illustrates an example of an optical add-drop device in accordance with embodiments of the invention. For example, this optical add-drop device may be used in the information processing system depicted in FIG. 2.

As depicted in FIG. 3, the optical add-drop device 2 includes an input port (INPUT), a through port (THROUGH), a drop port (DROP), an add port (ADD), and a plurality of optical circuits 10 (10a, 10b). Each of the optical circuits 10 includes three sub optical circuits. In the example depicted in FIG. 3, the optical circuit 10a includes sub optical circuits 11a-13a, and the optical circuit 10b includes sub optical circuits 11b-13b. The optical add-drop device 2 processes WDM signals.

The optical add-drop device 2 is configured to process a wavelength designated in advance (hereinafter referred to as λi). A WDM signal is input to the optical add-drop device 2 via the input port. The optical add-drop device 2 drops an optical signal λi from the WDM signal. The optical signal λi is guided to the drop port via the sub optical circuits 11a, 12a, 11b, and 12b. The WDM signal with the optical signal λi removed therefrom is guided to the sub optical circuit 13a.

An optical signal λia is supplied to the add port. The optical signals λi and λia have substantially the same wavelengths. The optical signal λia is guided to the sub optical circuit 13a via the sub optical circuit 13b. The sub optical circuit 13a adds the optical signal λia to the WDM signal guided from the sub optical circuit 11a and outputs the resultant signal via the through port.

Figure 4A:
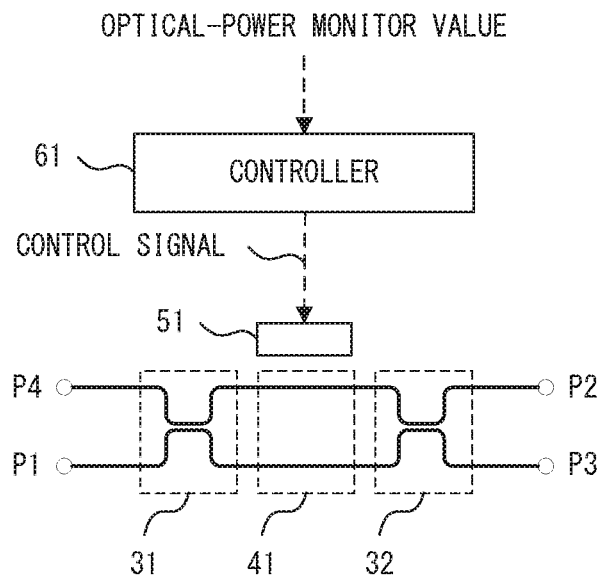
FIGS. 4A and 4B illustrate examples of sub optical circuits.
Figure 4B:
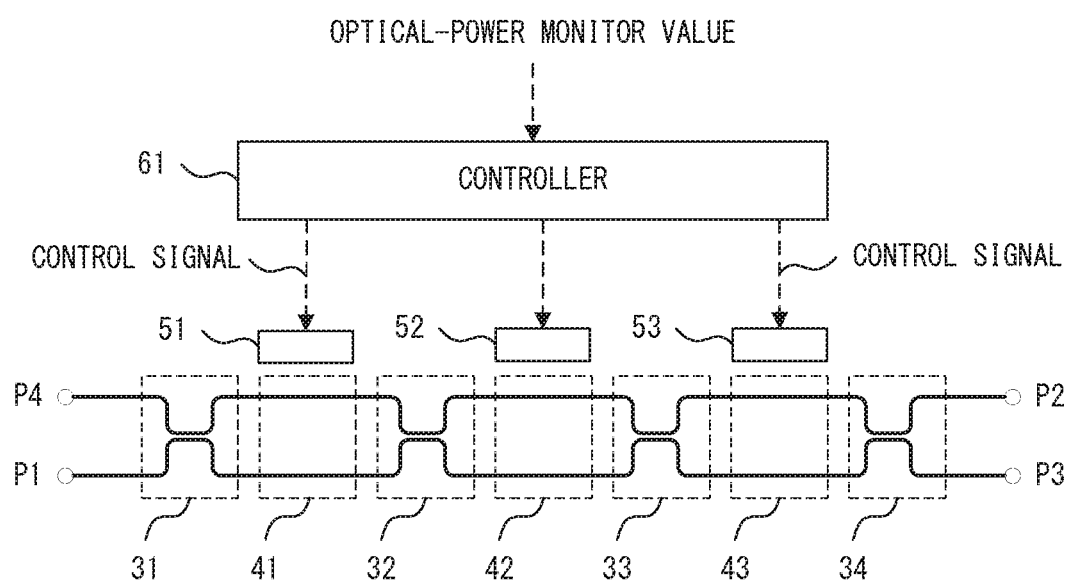

Each of the sub optical circuits (11a-13a, 11b-13b) includes a phase shifter implemented between a plurality of 2×2 couplers, as depicted in FIGS. 4A and 4B. In this example, when including N 2×2 couplers, the sub optical circuit includes N-1 phase shifters.

In the example depicted in FIG. 4A, the sub optical circuit includes two 2×2 couplers (31, 32). In this case, the sub optical circuit includes one phase shifter (41). Note that a 2×2 coupler provided at an input terminal of a sub optical circuit may be referred to as an "input coupler". A 2×2 coupler provided at an output terminal of a sub optical circuit may be referred to as an "output coupler". In the example depicted in FIG. 4A, the 2×2 coupler 31 is used as an "input coupler", and the 2×2 coupler 32 is used as an "output coupler". However, input couplers provided in the sub optical circuits (11a and 11b in FIG. 3) on the first stages and in the sub optical circuits (12a and 12b in FIG. 3) on the second stages may be implemented by 1×2 couplers which each include one input port and two output ports, rather than by 2×2 couplers.

The phase shifter 41 includes a pair of optical waveguides (an upper-arm optical waveguide and a lower-arm optical waveguide). The phase shifter 41 provides a specified phase difference between the upper-arm optical waveguide and the lower-arm optical waveguide. In particular, the phase shifter 41 is configured such that when light input to the phase shifter 41 is split and guided to the upper-arm optical waveguide and the lower-arm optical waveguide, the difference between the phase of the light that propagates through the upper-arm optical waveguide and arrives at the output terminal and the phase of the light that propagates through the lower-arm optical waveguide and arrives at the output terminal becomes a specified value. Hence, this phase difference corresponds to the difference between the optical path length of the upper-arm optical waveguide and the optical path length of the lower-arm optical waveguide. This difference may hereinafter be referred to as a "path length difference".

For example, the path length difference in the phase shifter 41 may be adjusted by controlling the temperature of the optical waveguides of the phase shifter 41. In this example, a heater 51 is provided in the vicinity of the optical waveguides of the phase shifter 41. The heater 51 is implemented by, for example, an electrical resistor such as a three-phase insulated wire (TIW). However, the heater 51 is not limited to a TIW and may be implemented by another component.

A controller 61 controls the path length difference in the phase shifter 41 according to an optical-power monitor value indicating output power of a specified sub optical circuit. The optical-power monitor value is monitored by an optical power monitor (not illustrated). The controller 61 controls a current through the heater 51 so as to increase or decrease the optical-power monitor value. A change in the current through the heater 51 will change the refractive indexes of the optical waveguides of the phase shifter 41, thereby adjusting the path length difference in the phase shifter 41.

In the example depicted in FIG. 4B, the sub optical circuit includes four 2×2 couplers (31-34) and three phase shifters (41-43). The phase shifters 41-43 are each implemented between 2×2 couplers. In particular, the phase shifter 41 is provided between the 2×2 couplers 31 and 32, the phase shifter 42 is provided between the 2×2 couplers 32 and 33, and the phase shifter 43 is provided between the 2×2 couplers 33 and 34. In this case, heaters 51-53 are provided in the vicinity of the phase shifters 41-43, respectively. The controller 61 adjusts the path length differences in the phase shifters 41-43 respectively by controlling currents through the heaters 51-53. The path length differences in the phase shifters 41-43 may be the same or may be different. As an example, when the path length difference in the phase shifter (phase shifter 41 in FIG. 4B) that is the closest to the input terminal is ΔL, the path length differences in the other phase shifters may be set to 2ΔL.

Each sub optical circuit includes two input ports (P1, P4) and two output ports (P2, P3), as depicted in FIGS. 4A and 4B. The input ports P1 and P4 correspond to input ports of the 2×2 coupler (i.e., input coupler) provided at the input terminal of the sub optical circuit. The output ports P2 and P3 correspond to output ports of the 2×2 coupler (i.e., output coupler) provided at the output terminal of the sub optical circuit.

Figure 5A:
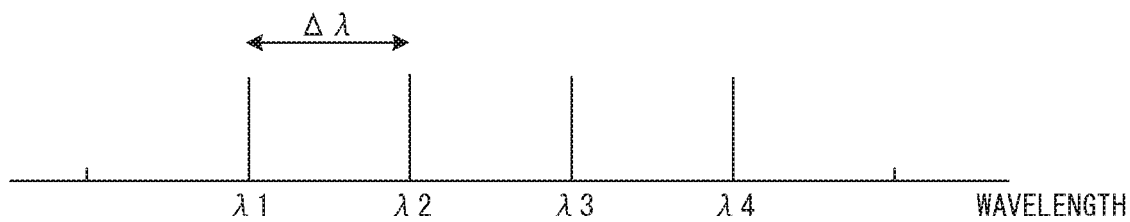
FIGS. 5A-5D illustrate examples of filter properties of sub optical circuits.

FIGS. 5A-5D illustrate examples of filter properties of sub optical circuits. In these examples, the wavelength channels of WDM signals are arranged at constant wavelength spacing Δλ, as depicted in FIG. 5A.

Figure 5B:
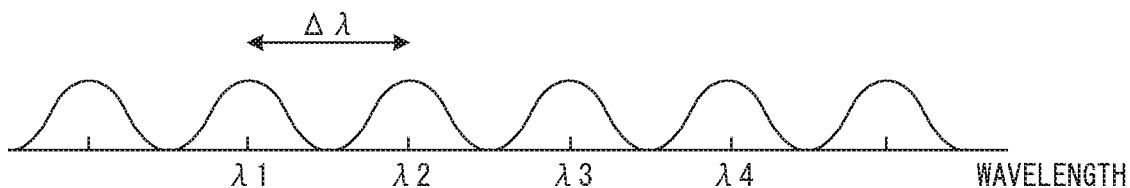

A phase shifter of a sub optical circuit may function as a wavelength filter. For example, the phase shifter 41 depicted in FIGS. 4A and 4B may have a filter property dependent on the difference (i.e., path length difference) between the optical path length of the upper-arm optical waveguide and the optical path length of the lower-arm optical waveguide. Specifically, a transmission property of the phase shifter is cyclically changed with respect to the wavelength. The cycle is dependent on the path length difference in the phase shifter. The path length difference in the phase shifter 41 achieved when the cycle of the transmission property of the phase shifter 41 is Δλ will hereinafter be expressed as "4ΔL". In this case, when the path length difference in the phase shifter 41 is controlled and set to 4Δλ, the cycle of the transmission property of the phase shifter 41 is Δλ, as depicted in FIG. 5B. Δλ indicates a wavelength spacing for a WDM signal.

Figure 5C:
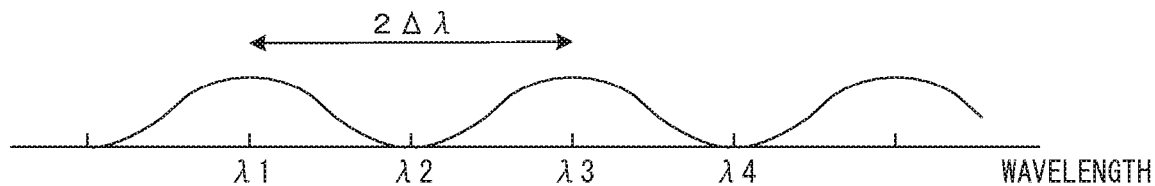
Figure 5D:
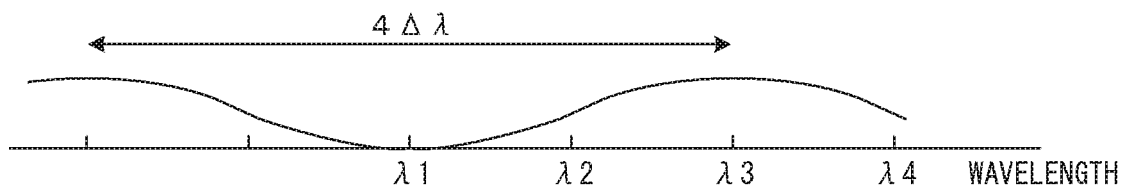

An increase in the path length difference in the phase shifter 41 provides a reduction in the cycle of the transmission property of the phase shifter 41, and a decrease in the path length difference in the phase shifter 41 provides an increase in the cycle of the transmission property of the phase shifter 41. The cycle of the transmission property of the phase shifter 41 is substantially inversely proportional to the path length difference in the phase shifter 41. Hence, when the path length difference in the phase shifter 41 is controlled and set to 2Δλ, the cycle of the transmission property of the phase shifter 41 is 2Δλ, as depicted in FIG. 5C. When the path length difference in the phase shifter 41 is controlled and set to Δλ, the cycle of the transmission property of the phase shifter 41 is 4Δλ, as depicted in FIG. 5D.

Each phase shifter includes two output ports (i.e., P2 and P3), as depicted in FIGS. 4A and 4B. The transmission property from the input port P1 to one of the output ports and the transmission property from the input port P1 to the other output port are inversions of each other.

As illustrated in FIG. 3, the first ports of the output couplers in the sub optical circuits 11a and 11b in the optical circuits 10 (10a, 10b) are optically coupled to the input couplers in the sub optical circuits 12a and 12b. The second ports of the output couplers in the sub optical circuits 11a and 11b are optically coupled to the second ports of the input couplers in the sub optical circuits 13a and 13b. The output couplers in the sub optical circuits 12a and 12b are optically coupled to the output ports of the hosting optical circuits. The output port of the optical circuit 10b is optically coupled to the drop port of the optical add-drop device. The first ports of the input couplers in the sub optical circuits 13a and 13b are optically coupled to the input ports of the hosting optical circuits. The input port of the optical circuit 10b is optically coupled to the add port of the optical add-drop device. One or some wavelength channels in a WDM signal that is input to the sub optical circuits 11a and 11b are guided to the output ports of the sub optical circuits 12a and 12b via these sub optical circuits, and the other wavelength channels in the WDM signal are guided to the sub optical circuits 13a and 13b. The sub optical circuits 13a and 13b respectively combine the wavelength channels guided from the sub optical circuits 11a and 11b and the wavelength channels guided via the input ports of the sub optical circuits 13a and 13b and outputs the result.

The following describes, in detail, the configuration and operations of the optical add-drop device 2 depicted in FIG. 3. The following description is based on the assumption that WDM signals that include optical signals λ1-λ4 are guided to the sub optical circuit 11a via the input port. The optical add-drop device 2 is configured to process light of wavelength λ1. In particular, the optical add-drop device 2 drops an optical signal λ1 from an input WDM signal. When an optical signal λ1a is input through the add port, the optical add-drop device 2 adds the optical signal λ1a to a WDM signal. Thus, the optical signal λ1 is replaced with the optical signal λ1a. Note that the wavelength of the optical signal λ1a is substantially the same as that of the optical signal λ1.

Figure 6:
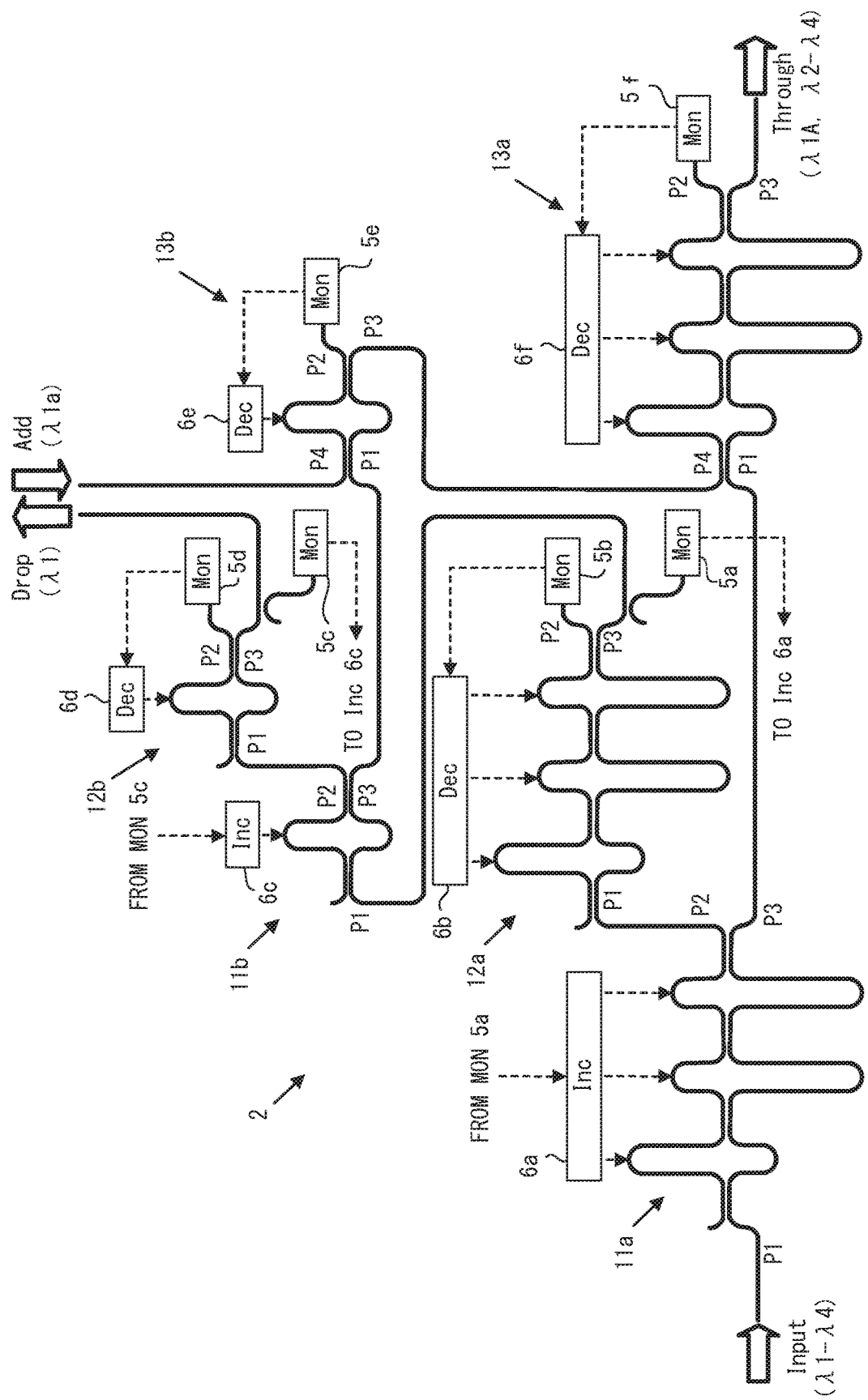
FIG. 6 illustrates an example of the configuration and operations of an optical add-drop device.

FIG. 6 illustrates an example of the configuration and operations of the optical add-drop device 2. The optical add-drop device 2 includes the sub optical circuits 11a-13a and 11b-13b, as described above by referring to FIG. 3. Each of the sub optical circuits 11a-13a and 11b-13b includes input ports P1 and P4 and output ports P2 and P3, as depicted in FIGS. 4A and 4B. In FIG. 6, the upper port of the two input ports of each of the sub optical circuits 11a-13a and 11b-13b corresponds to an input port P4, and the lower port corresponds to an input port P1. The upper port of the two output ports of each of the sub optical circuits 11a-13a and 11b-13b corresponds to an output port P2, and the lower port corresponds to an output port P3.

The input port of the optical add-drop device 2 is optically coupled to the input port P1 of the sub optical circuit 11a. The output port P2 of the sub optical circuit 11a is optically coupled to the input port P1 of the sub optical circuit 12a. The output port P3 of the sub optical circuit 11a is optically coupled to the input port P1 of the sub optical circuit 13a. The output port P3 of the sub optical circuit 12a is optically coupled to the input port P1 of the sub optical circuit 11b. The output port P2 of the sub optical circuit 11b is optically coupled to the input port P1 of the sub optical circuit 12b. The output port P3 of the sub optical circuit 11b is optically coupled to the input port P1 of the sub optical circuit 13b.

The output port P3 of the sub optical circuit 12b is optically coupled to the drop port of the optical add-drop device 2. The add port of the optical add-drop device 2 is optically coupled to the input port P4 of the sub optical circuit 13b. The output port P3 of the sub optical circuit 13b is optically coupled to the input port P4 of the sub optical circuit 13a. The output port P3 of the sub optical circuit 13a is optically coupled to the through port of the optical add-drop device 2.

The optical add-drop device 2 also includes optical monitors 5a-5f that respectively monitor optical power. For example, each of the optical monitors 5a-5f may include a photodetector such as a photodiode. In this case, each of the optical monitors 5a-5f may include an amplifier for converting an output current of the photodetector into a voltage signal.

The optical monitor 5a generates an optical-power monitor value indicating output optical power of the output port P3 of the sub optical circuit 12a. The optical monitor 5b generates an optical-power monitor value indicating output optical power of the output port P2 of the sub optical circuit 12a. The optical monitor 5c generates an optical-power monitor value indicating output optical power of the output port P3 of the sub optical circuit 12b. The optical monitor 5d generates an optical-power monitor value indicating output optical power of the output port P2 of the sub optical circuit 12b. The optical monitor 5e generates an optical-power monitor value indicating output optical power of the output port P2 of the sub optical circuit 13b. The optical monitor 5f generates an optical-power monitor value indicating output optical power of the output port P2 of the sub optical circuit 13a.

In addition, the optical add-drop device 2 includes controllers 6a-6f that respectively control the path length differences in corresponding phase shifters according to the optical-power monitor values generated by the optical monitors 5a-5f. Each of the controllers 6a-6f corresponds to the controller 61 depicted in FIG. 4A or 4B. In FIG. 6, "Inc" indicates a controller that performs feedback control for increasing optical power detected by a corresponding optical monitor. "Dec" indicates a controller that performs feedback control for decreasing optical power detected by a corresponding optical monitor.

The controller 6a adjusts the path length difference in each phase shifter of the sub optical circuit 11a so as to increase optical power detected by the optical monitor 5a. The controller 6b adjusts the path length difference in each phase shifter of the sub optical circuit 12a so as to decrease optical power detected by the optical monitor 5b. The controller 6c adjusts the path length difference in each phase shifter of the sub optical circuit 11b so as to increase optical power detected by the optical monitor 5c. The controller 6d adjusts the path length difference in each phase shifter of the sub optical circuit 12b so as to decrease optical power detected by the optical monitor 5d. The controller 6e adjusts the path length difference in each phase shifter of the sub optical circuit 13b so as to decrease optical power detected by the optical monitor 5e. The controller 6f adjusts the path length difference in each phase shifter of the sub optical circuit 13a so as to decrease optical power detected by the optical monitor 5f. In this example, the path length differences in the phase shifters are adjusted by changing the refractive indexes of the optical waveguides of the phase shifters by controlling the current through the heaters 51, as described above by referring to FIGS. 4A and 4B.

For example, the controllers 6a-6f may be implemented by a processor system that includes a processor and a memory. In this case, the function of the controllers 6a-6f may be implemented by one or more processors. The function of the controllers 6a-6f may be implemented by a hardware circuit.

The following describes operations of each sub optical circuit. Each of the sub optical circuits 11a-13a includes the 2×2 couplers 31-34, the phase shifters 41-43, the input ports P1 and P4, and the output ports P2 and P3, as depicted in FIG. 4B. In this example, the path length difference in the phase shifter 41 is $2\Delta L$. Thus, the cycle of the transmission property of the phase shifter 41 is $2\Delta\lambda$, as depicted in FIG. 5C. The path length differences in the phase shifters 42 and 43 are each $4\Delta L$. Thus, the cycle of the transmission property of each of the phase shifters 42 and 43 is $\Delta\lambda$, as depicted in FIG. 5B.

Figure 7A:
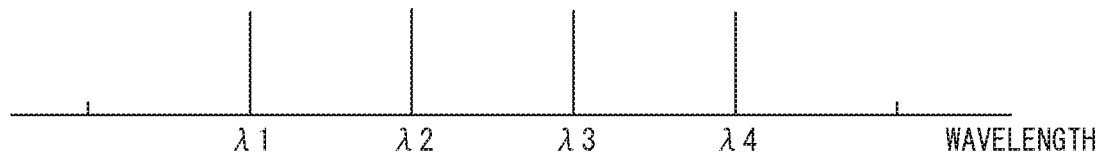
FIGS. 7A-7E, 8A-8D, 9A-9D, 10A-10D, 11A-11F, and 12A-12F illustrate examples of operations of sub optical circuits.

FIGS. 7A-7E illustrate an example of operations of the sub optical circuit 11a. A WDM signal depicted in FIG. 7A is input to the input port P1 of the sub optical circuit 11a. The WDM signal includes optical signals $\lambda 1$-$\lambda 4$. The optical signals $\lambda 1$-$\lambda 4$ are arranged at wavelength spacing $\Delta\lambda$.

Figure 7B:
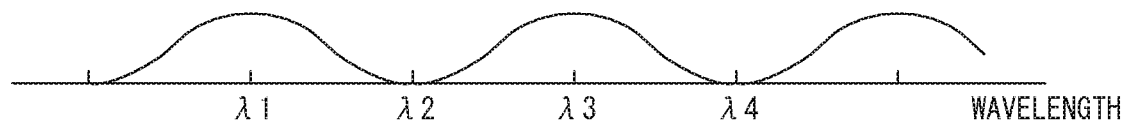
Figure 7C:
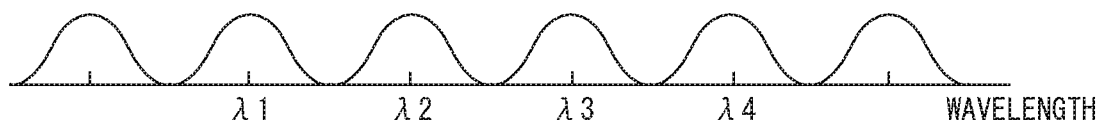
Figure 7D:
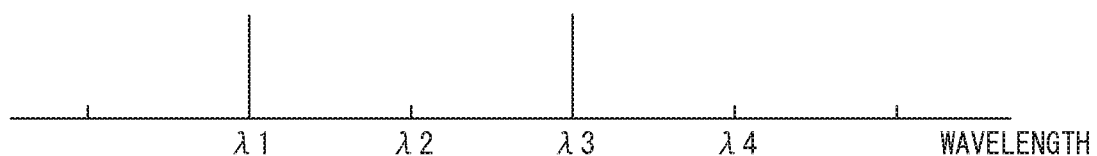

The phase shifter 41 of the sub optical circuit 11a is adjusted by the controller 6a depicted in FIG. 6 so as to achieve a transmission property depicted in FIG. 7B. Accordingly, the phase shifter 41 is adjusted to transmit wavelengths $\lambda 1$ and $\lambda 3$ and block wavelengths $\lambda 2$ and $\lambda 4$. This transmission property indicates the filter property of an optical path between the input port P1 and the output port P2. The phase shifters 42 and 43 of the sub optical circuit 11a are adjusted by the controller 6a so as to each achieve a transmission property depicted in FIG. 7C. In particular, the phase shifters 42 and 43 are adjusted to each transmit wavelengths $\lambda 1$, $\lambda 2$, $\lambda 3$, and $\lambda 4$. Thus, output light of the output port P2 includes optical signals $\lambda 1$ and $\lambda 3$ but does not include optical signals $\lambda 2$ and $\lambda 4$, as depicted in FIG. 7D. The output light of the output port P2 of the sub optical circuit 11a is guided to the input port P1 of the sub optical circuit 12a.

Figure 7E:
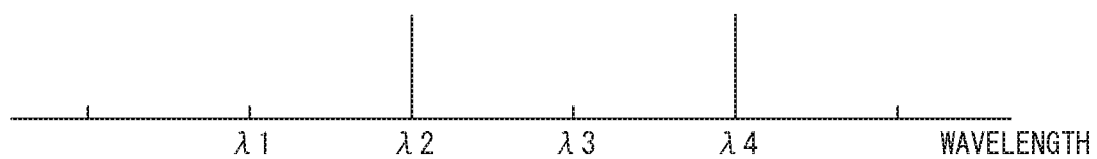

As described above, the transmission property from the input port P1 to one of the output ports and the transmission property from the input port P1 to the other output port are inversions of each other. Thus, input light of the sub optical circuit 11a is demultiplexed into light components to be output via the output port P2 and light components to be output via the output port P3. Thus, output light of the output port P3 includes optical signals $\lambda 2$ and $\lambda 4$ but does not include optical signals $\lambda 1$ and $\lambda 3$, as depicted in FIG. 7E. The output light of the output port P3 of the sub optical circuit 11a is guided to the input port P1 of the sub optical circuit 13a.

The sub optical circuit 11a includes the phase shifters 42 and 43 on the output side of the phase shifter 41. The phase shifters 42 and 43 are provided to realize a good transmission property. For example, when a filtering operation is performed with the transmission property depicted in FIG. 7B, noise components may remain in wavelength regions in the vicinity of wavelength $\lambda 1$ and $\lambda 3$. Accordingly, the filtering process with the transmission property depicted in FIG. 7C is applied to the output light of the phase shifter 41 so as to reduce the noise components in the vicinity of wavelength $\lambda 1$ and $\lambda 3$. However, the phase shifters 42 and 43 are not essential components for the sub optical circuit 11a. Note that descriptions pertaining to the phase shifters 42 and 43 are omitted in the descriptions of the sub optical circuits 12a and 13a herein.

Figure 8A:
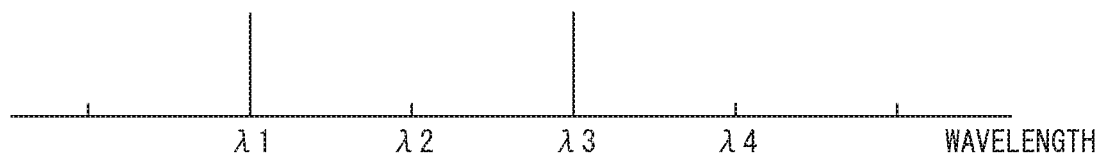

FIGS. 8A-8D illustrate an example of operations of the sub optical circuit 12a. Output light of the output port P2 of the sub optical circuit 11a is guided to the input port P1 of the sub optical circuit 12a. Thus, optical signals λ1 and λ3 are input to the input port P1 of the sub optical circuit 12a, as depicted in FIG. 8A.

Figure 8B:
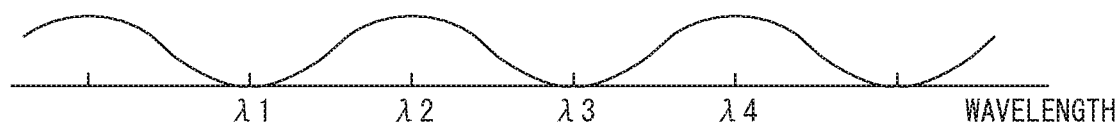
Figure 8C:
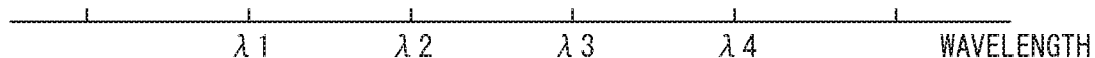
Figure 8D:
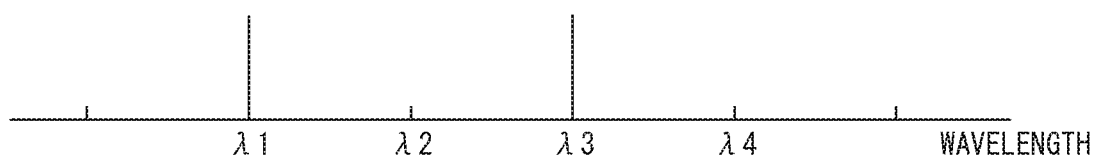

The phase shifter 41 of the sub optical circuit 12a is adjusted by the controller 6b depicted in FIG. 6 so as to achieve a transmission property depicted in FIG. 8B. Accordingly, the phase shifter 41 is adjusted to transmit wavelengths λ2 and λ4 and block wavelengths λ1 and λ3. Thus, output light of the output port P2 includes substantially no optical signals λ1-λ4, as depicted in FIG. 8C. Meanwhile, output light of the output port P3 includes optical signals λ1 and λ3, as depicted in FIG. 8D. The output light of the output port P3 of the sub optical circuit 12a is guided to the input port P1 of the sub optical circuit 11b.

Each of the sub optical circuits 11b-13b includes the 2×2 couplers 31 and 32, the phase shifter 41, the input ports P1 and P4, and the output ports P2 and P3, as depicted in FIG. 4A. The path length differences in the phase shifters 41 of the sub optical circuits 11b-13b are each ΔL. Thus, the cycle of the transmission property of each of the phase shifters 41 in the sub optical circuits 11b-13b are 4Δλ, as depicted in FIG. 5D.

Figure 9A:
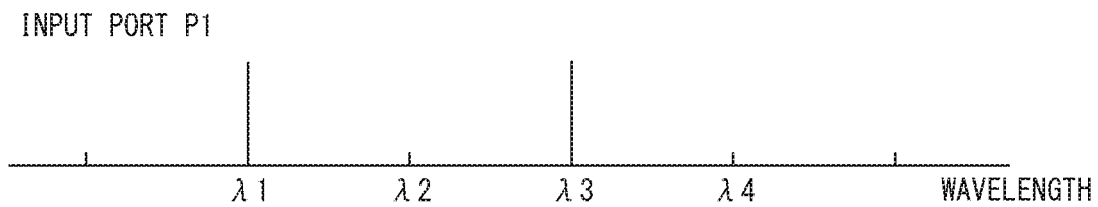

FIGS. 9A-9D illustrate an example of operations of the sub optical circuit 11b. Output light of the output port P3 of the sub optical circuit 12a is guided to the input port P1 of the sub optical circuit 11b. Thus, optical signals λ1 and λ3 are input to the input port P1 of the sub optical circuit 11b, as depicted in FIG. 9A.

Figure 9B:
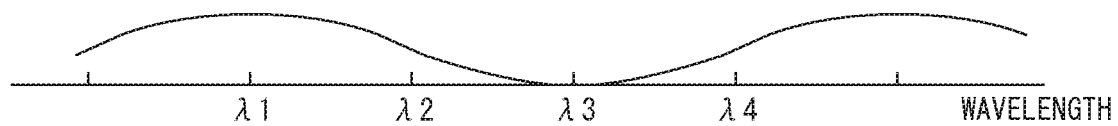
Figure 9C:
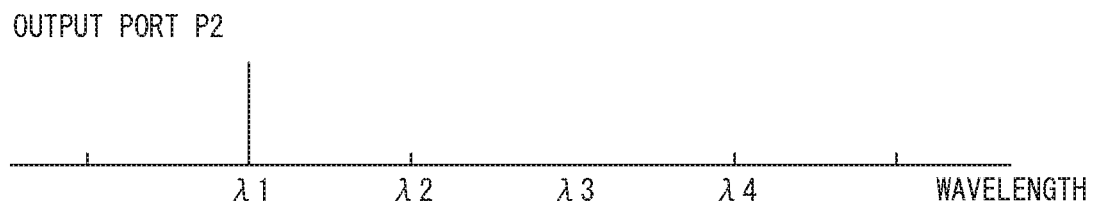
Figure 9D:
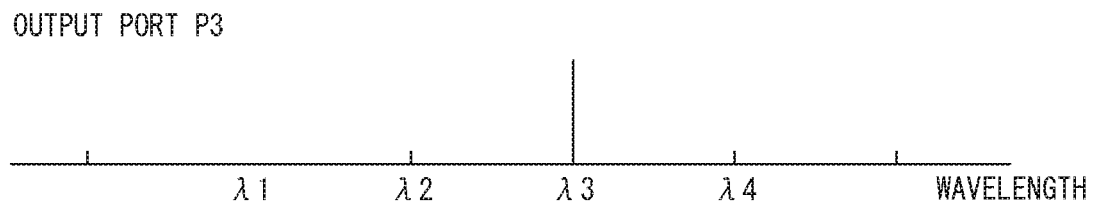

The phase shifter 41 in the sub optical circuit 11b is adjusted by the controller 6c depicted in FIG. 6 so as to achieve a transmission property depicted in FIG. 9B. Accordingly, the phase shifter 41 is adjusted to transmit wavelength λ1 and block the other frequency components. Hence, output light of the output port P2 includes an optical signal λ1, as depicted in FIG. 9C. The output light of the output port P2 is guided to the input port P1 of the sub optical circuit 12b. Meanwhile, output light of the output port P3 includes an optical signal λ3, as depicted in FIG. 9D. The output light of the output port P3 of the sub optical circuit 11b is guided to the input port P1 of the sub optical circuit 13b.

Figure 10A:
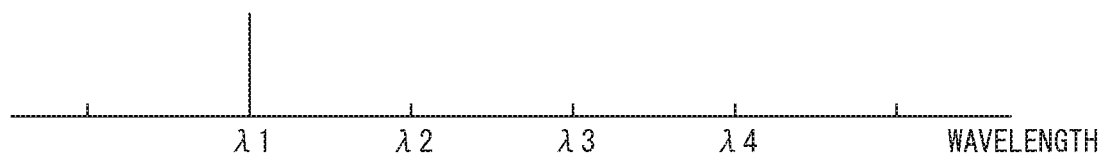

FIGS. 10A-10D illustrate an example of operations of the sub optical circuit 12b. Output light of the output port P2 of the sub optical circuit 11b is guided to the input port P1 of the sub optical circuit 12b. Thus, the optical signal λ1 is input to the input port P1 of the sub optical circuit 12b, as depicted in FIG. 10A.

Figure 10B:
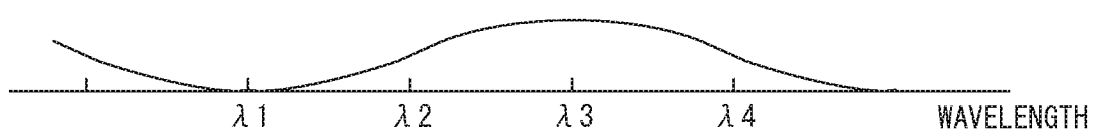
Figure 10C:
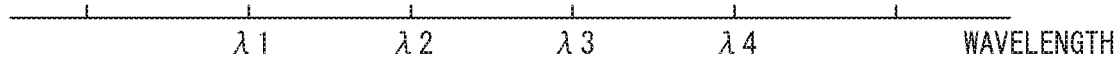
Figure 10D:
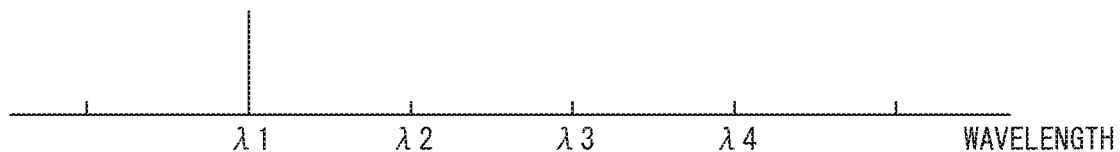

The phase shifter 41 in the sub optical circuit 12b is adjusted by the controller 6d depicted in FIG. 6 so as to achieve a transmission property depicted in FIG. 10B. Accordingly, the phase shifter 41 is adjusted to transmit wavelength λ3 and block the other frequency components. Thus, output light of the output port P2 includes substantially no optical signals λ1-λ4, as depicted in FIG. 10C. Meanwhile, output light of the output port P3 includes an optical signal λ1, as depicted in FIG. 10D. The output light of the output port P3 of the sub optical circuit 12b is guided to the drop port of the optical add-drop device 2.

Figure 11A:
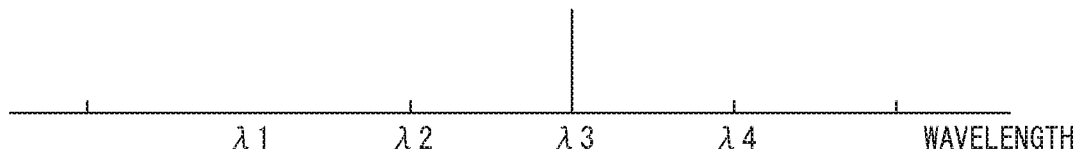
Figure 11B:
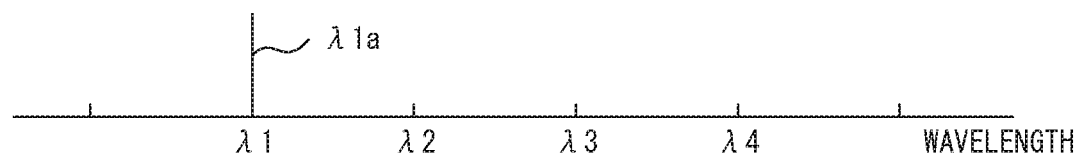

FIGS. 11A-11F illustrate an example of operations of the sub optical circuit 13b. Output light of the output port P3 of the sub optical circuit 11b is guided to the input port P1 of the sub optical circuit 13b. Thus, the optical signal λ3 is input to the input port P1 of the sub optical circuit 13b, as depicted in FIG. 11A. The optical signal λ1a depicted in FIG. 11B is guided to the input port P4 of the sub optical circuit 13b via the add port of the optical add-drop device 2.

The wavelength of the optical signal λ1a is substantially the same as that of the optical signal λ1.

Figure 11C:
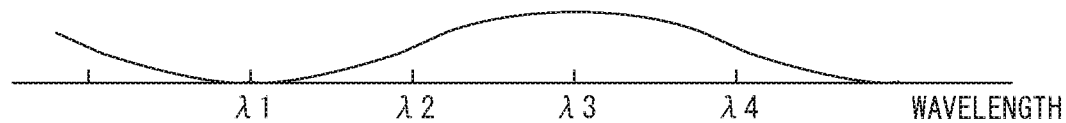
Figure 11D:
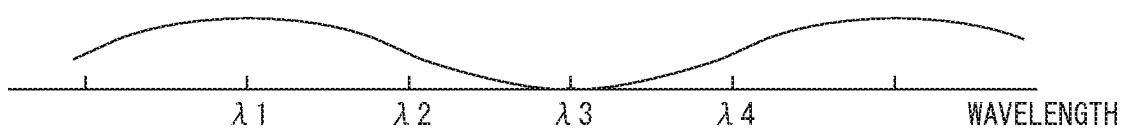
Figure 11E:
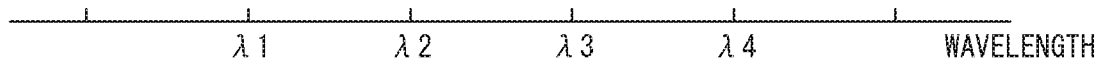
Figure 11F:
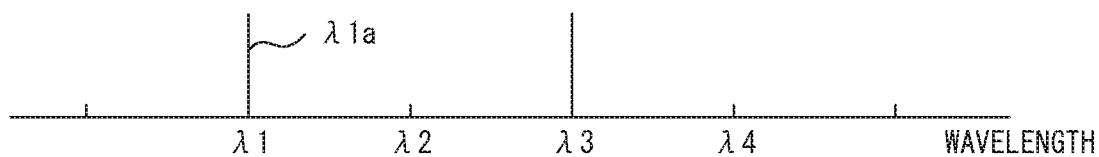

The controller 6e depicted in FIG. 6 adjusts the phase shifter 41 in the sub optical circuit 13b so as to achieve a transmission property depicted in FIG. 11C for the optical path between the input port P1 and the output port P3 and achieve a transmission property depicted in FIG. 11D for the optical path between the input port P4 and the output port P3. Hence, the phase shifter 41 guides the optical signal λ3 input through the input port P1 to the output port P3 and guides the optical signal λ1a input through the input port P4 to the output port P3. Thus, output light of the output port P2 includes substantially no optical signals λ1-λ4, as depicted in FIG. 11E. Meanwhile, output light of the output port P3 includes optical signals λ1a and λ3, as depicted in FIG. 11F. The output light of the output port P3 of the sub optical circuit 13b is guided to the input port P4 of the sub optical circuit 13a.

Figure 12A:
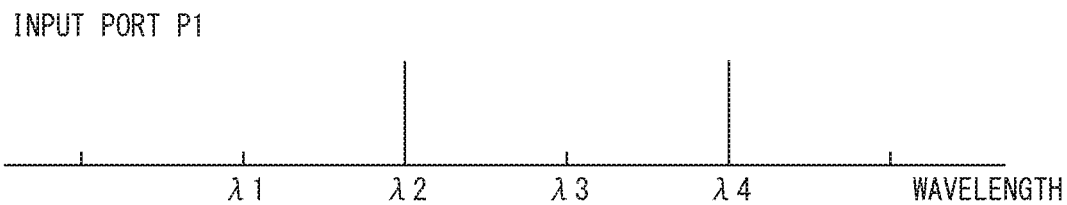
Figure 12B:
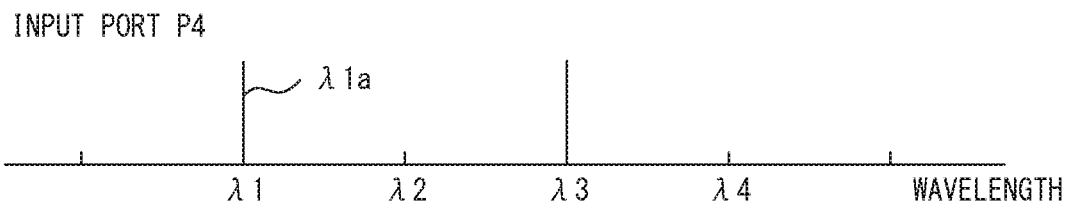

FIGS. 12A-12F illustrate an example of operations of the sub optical circuit 13a. Output light of the output port P3 of the sub optical circuit 11a is guided to the input port P1 of the sub optical circuit 13a. Thus, optical signals λ2 and λ4 are input to the input port P1 of the sub optical circuit 13a, as depicted in FIG. 12A. Output light of the output port P3 of the sub optical circuit 13b is guided to the input port P4 of the sub optical circuit 13a. Thus, optical signals λ1a and λ3 are input to the input port P4 of the sub optical circuit 13a, as depicted in FIG. 12B.

Figure 12C:
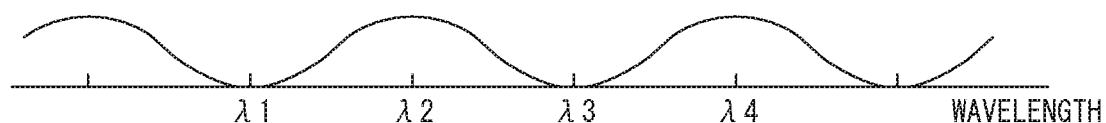
Figure 12D:
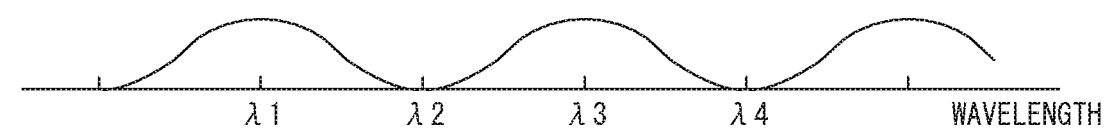
Figure 12E:
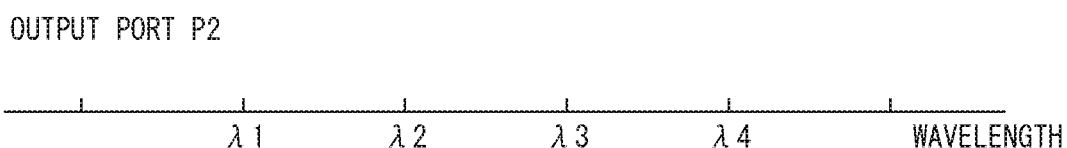
Figure 12F:
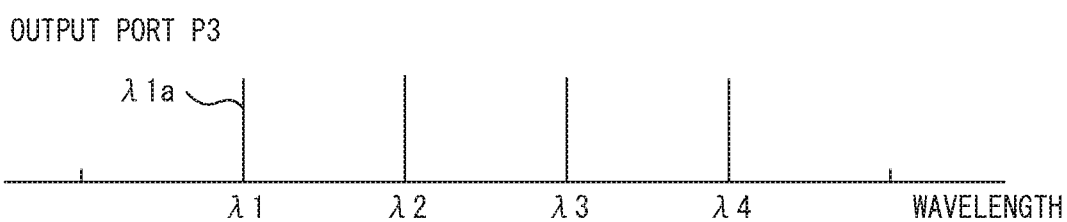

The controller 6f depicted in FIG. 6 adjusts the phase shifter 41 in the sub optical circuit 13a so as to achieve a transmission property depicted in FIG. 12C for the optical path between the input port P1 and the output port P3 and achieve a transmission property depicted in FIG. 12D for the optical path between the input port P4 and the output port P3. Hence, the phase shifter 41 guides optical signals λ2 and λ4 input through the input port P1 to the output port P3 and guides optical signals λ1a and λ3 input through the input port P4 to the output port P3. Thus, output light of the output port P2 includes substantially no optical signals λ1-λ4, as depicted in FIG. 12E. Meanwhile, output light of the output port P3 includes optical signals λ1a and λ2-λ4, as depicted in FIG. 12F. The output light of the output port P3 is guided to the through port of the optical add-drop device 2.

As described above, the sub optical circuits 11a, 12a, 11b, and 12b drop an optical signal λ1 from an input WDM signal and guide this optical signal to the drop port. In this case, an optical signal λ3 is guided from the sub optical circuit 11a via the sub optical circuits 12a, 11b, and 13b to the sub optical circuit 13a. Optical signals λ2 and λ4 are guided from the sub optical circuit 11a to the sub optical circuit 13a. In addition, an optical signal λ1a input through the add port of the optical add-drop device 2 is guided to the sub optical circuit 13a via the sub optical circuit 13b. The sub optical circuit 13a combines the optical signals λ1a and λ2-λ4. The combined optical signals λ1a and λ2-λ4 are output through the through port of the optical add-drop device 2.

The following describes operations of the controllers 6a-6f. The controllers 6a-6f respectively adjust the path length differences in the phase shifters according to optical-power monitor values generated by the corresponding optical monitors 5a-5f.

The controller 6a adjusts the path length differences in the phase shifters in the sub optical circuit 11a according to an optical-power monitor value generated by the optical monitor 5a. In this example, the sub optical circuit 11a needs to guide optical signals λ1 and λ3 to the sub optical circuit 12a. The optical monitor 5a detects power of the optical signals λ1 and λ3 output from the sub optical circuit 12a. Hence, when the optical power detected by the optical monitor 5a is high, the optical signals λ1 and λ3 are considered to have been properly guided from the sub optical circuit 11a to the sub optical circuit 12a. Thus, the controller 6a adjusts the path length differences in the phase shifters in the sub optical circuit 11a in such a manner as to increase the optical-power monitor value generated by the optical monitor 5a (preferably bring the value to a peak). As a result, the transmission properties depicted in FIGS. 7B-7C are realized, and the outputs depicted in FIGS. 7D-7E are provided.

The controller 6b adjusts the path length differences in the phase shifters in the sub optical circuit 12a according to an optical-power monitor value generated by the optical monitor 5b. In this example, the sub optical circuit 12a needs to output optical signals λ1 and λ3 via the output port P3. Meanwhile, the optical monitor 5b detects output optical power of the output port P2 of the sub optical circuit 12a. Hence, when the optical power detected by the optical monitor 5b is low, the optical signals λ1 and λ3 are considered to have been properly output via the output port P3. Thus, the controller 6b adjusts the path length differences in the phase shifters in the sub optical circuit 12a in such a manner as to decrease the optical-power monitor value generated by the optical monitor 5b (preferably bring the value close to zero). As a result, the transmission property depicted in FIG. 8B is realized, and the outputs depicted in FIGS. 8C-8D are provided.

As described above, according to the optical-power monitor value generated by the optical monitor 5a, the controller 6a controls the phase shifters in the sub optical circuit 11a in such a manner as to increase the output optical power of the output port P3 of the sub optical circuit 12a. Meanwhile, according to the optical-power monitor value generated by the optical monitor 5b, the controller 6b controls the phase shifters in the sub optical circuit 12a in such a manner as to decrease the output optical power of the output port P2 of the sub optical circuit 12a. In this example, decreasing the output optical power of the output port P2 of the sub optical circuit 12a is equivalent to increasing the output optical power of the output port P3 of the sub optical circuit 12a. Accordingly, the controllers 6a and 6b control the phase shifters in the sub optical circuits 11a and 12a in such a manner as to increase the power of light guided from the sub optical circuit 12a to the sub optical circuit 11b.

The controller 6c adjusts the path length differences in the phase shifters in the sub optical circuit 11b according to an optical-power monitor value generated by the optical monitor 5c. In this example, the sub optical circuit 11b needs to guide an optical signal λ1 to the sub optical circuit 12b. The optical monitor 5c detects power of the optical signal λ1 output from the sub optical circuit 12b. Hence, when the optical power detected by the optical monitor 5c is high, the optical signal λ1 is considered to have been properly guided from the sub optical circuit 11b to the sub optical circuit 12b. Thus, the controller 6c adjusts the path length differences in the phase shifters in the sub optical circuit 11b in such a manner as to increase the optical-power monitor value generated by the optical monitor 5c (preferably bring the value to a peak). As a result, the transmission property depicted in FIG. 9B is realized, and the outputs depicted in FIGS. 9C-9D are provided.

The controller 6d adjusts the path length differences in the phase shifters in the sub optical circuit 12b according to an optical-power monitor value generated by the optical monitor 5d. In this example, the sub optical circuit 12b needs to output an optical signal λ1 via the output port P3. Meanwhile, the optical monitor 5d detects output optical power of the output port P2 of the sub optical circuit 12b. Hence, when the optical power detected by the optical monitor 5d is low, the optical signal λ1 is considered to have been properly output via the output port P3. Thus, the controller 6d adjusts the path length differences in the phase shifters in the sub optical circuit 12b in such a manner as to decrease the optical-power monitor value generated by the optical monitor 5d (preferably bring the value close to zero). As a result, the transmission property depicted in FIG. 10B is realized, and the outputs depicted in FIGS. 10C-10D are provided.

As described above, according to the optical-power monitor value generated by the optical monitor 5c, the controller 6c controls the phase shifters in the sub optical circuit 11b in such a manner as to increase the output optical power of the output port P3 of the sub optical circuit 12b. Meanwhile, according to the optical-power monitor value generated by the optical monitor 5d, the controller 6d controls the phase shifters in the sub optical circuit 12a in such a manner as to decrease the output optical power of the output port P2 of the sub optical circuit 12b. In this example, decreasing the output optical power of the output port P2 of the sub optical circuit 12b is equivalent to increasing the output optical power of the output port P3 of the sub optical circuit 12b. Accordingly, the controllers 6c and 6d control the phase shifters in the sub optical circuits 11b and 12b in such a manner as to increase the power of light guided from the sub optical circuit 12b to the drop port of the optical add-drop device 2.

The controller 6e adjusts the path length differences in the phase shifters in the sub optical circuit 13b according to an optical-power monitor value generated by the optical monitor 5e. In this example, the sub optical circuit 13b needs to output optical signals λ1a and λ3 via the output port P3. Meanwhile, the optical monitor 5e detects output optical power of the output port P2 of the sub optical circuit 13b. Hence, when the optical power detected by the optical monitor 5e is low, the optical signals λ1a and λ3 are considered to have been properly output via the output port P3. Thus, the controller 6e adjusts the path length differences in the phase shifters in the sub optical circuit 13b in such a manner as to decrease the optical-power monitor value generated by the optical monitor 5e (preferably bring the value close to zero). As a result, the transmission properties depicted in FIGS. 11C-11D are realized, and the outputs depicted in FIGS. 11E-11F are provided.

As described above, according to the optical-power monitor value generated by the optical monitor 5e, the controller 6e controls the phase shifters in the sub optical circuit 13b in such a manner as to decrease the output optical power of the output port P2 of the sub optical circuit 13b. In this example, decreasing the output optical power of the output port P2 of the sub optical circuit 13b is equivalent to increasing the output optical power of the output port P3 of the sub optical circuit 13b. Accordingly, the controller 6e controls the phase shifters in the sub optical circuit 13b in such a manner as to increase the power of light guided from the sub optical circuit 13b to the sub optical circuit 13a.

The controller 6f adjusts the path length differences in the phase shifters in the sub optical circuit 13a according to an optical-power monitor value generated by the optical monitor 5f. In this example, the sub optical circuit 13a needs to output optical signals λ1a and λ2-λ4 via the output port P3. Meanwhile, the optical monitor 5f detects output optical power of the output port P2 of the sub optical circuit 13a. Hence, when the optical power detected by the optical monitor 5f is low, the optical signals λ1a and λ2-λ4 are considered to have been properly output via the output port P3. Thus, the controller 6f adjusts the path length differences in the phase shifters in the sub optical circuit 13a in such a manner as to decrease the optical-power monitor value generated by the optical monitor 5f (preferably bring the value close to zero). As a result, the transmission properties depicted in FIGS. 12C-12D are realized, and the outputs depicted in FIGS. 12E-12F are provided.

According to the optical-power monitor value generated by the optical monitor 5f, the controller 6f controls the phase shifters in the sub optical circuit 13a in such a manner as to decrease the output optical power of the output port P2 of the sub optical circuit 13a. In this example, decreasing the output optical power of the output port P2 of the sub optical circuit 13a is equivalent to increasing the output optical power of the output port P3 of the sub optical circuit 13a. Accordingly, the controller 6f controls the phase shifters in the sub optical circuit 13a in such a manner as to increase the power of light guided from the sub optical circuit 13a to the through port of the optical add-drop device 2.

As described above, the optical add-drop device 2 processes one of a plurality of optical signals multiplexed in a WDM signal. In the examples depicted in FIGS. 7A-12F, the optical signal λ1 is processed. The optical add-drop device 2 may process an arbitrary wavelength by adjusting the transmission properties of the phase shifters.

The controllers 6a-6f may control the path length differences in the phase shifters by dithering. In this case, for example, the controller 6a may increase or decrease a current through a corresponding heater by Δi and detect a change in an optical-power monitor value detected by the optical monitor 5a. In this example, when the optical power is increased, the controller 6a will also increase the current through the corresponding heater by Δi in a subsequent control step. When the optical power is decreased, the controller 6a will decrease the current through the corresponding heater by Δi in the subsequent control step. By repeatedly performing this processing step, the optical-power monitor value detected by the optical monitor 5a is maximized, thereby optimizing the states of the phase shifters in the sub optical circuit 11a. Operations of the controller 6c are substantially the same as those of the controller 6a. The controllers 6b and 6d-6f perform dithering to minimize corresponding optical-power monitor values.

The adjustments of the phase shifters may be performed before an actual communication is started. In this case, the following adjustment sequences 1 and 2 are performed.

Adjustment sequence 1: An optical signal (optical signal λ1 in the examples depicted in FIGS. 7A-12F) of a wavelength that is to be dropped in the optical add-drop device 2 enters the input port of the optical add-drop device 2. The phase shifters implanted between the input port and the drop port are adjusted. In this way, the phase shifters in the sub optical circuits 11a, 12a, 11b, and 12b are adjusted.

Adjustment sequence 2: An optical signal (optical signal λ1a in the examples depicted in FIGS. 7A-12F) of a wavelength that is to be added in the optical add-drop device 2 enters the add port of the optical add-drop device 2. The phase shifters implemented between the add port and the through port are adjusted. In this way, the phase shifters in the sub optical circuits 13b and 13a are adjusted.

The controllers 6a-6f may perform the adjustment sequence 2 after performing the adjustment sequence 1. The controllers 6a-6f may also perform the adjustment sequence 1 after performing the adjustment sequence 2. Alternatively, the controllers 6a-6f may concurrently perform the adjustment sequences 1 and 2. For example, the controllers 6a-6f may perform the adjustment sequences in cooperation with each other. Alternatively, the controllers 6a-6f may perform the adjustment sequences in accordance with an instruction from a management unit that manages the controllers 6a-6f.

In the examples described above, the refractive indexes of the optical waveguides of the phase shifters are adjusted according to temperature control. However, embodiments of the invention are not limited to this configuration. In particular, the refractive index of the optical waveguide may be adjusted using another method. For example, the refractive index of the optical waveguide may be adjusted by applying a bias voltage using a PN junction. Alternatively, a polymer having an electro-optical effect may be provided in the vicinity of the optical waveguide. Although a core and a cladding material of the optical waveguide are respectively formed from, for example, Si and SiO2, embodiments of the invention are not limited to this configuration.

As described above, the optical add-drop device 2 in accordance with embodiments of the invention includes a plurality of sub optical circuits, and each sub optical circuit includes phase a plurality of 2×2 couplers and a phase shifter implemented between the plurality of 2×2 couplers. The path length differences in the phase shifters are controlled to adjust the transmission properties of the sub optical circuits, thereby dropping or adding optical signals of a specified wavelength. Thus, a loss or crosstalk that could occur when dropping or adding an optical signal can be reduced without introducing an accurate manufacturing process. Use of a moderately accurate manufacturing process will allow optical integrated circuits for WDM receivers to be provided at low cost. In addition, optical signals can be dropped or added with a low loss even in an environment where temperature varies.

Number of Wavelengths of WDM

In the examples depicted in FIGS. 3-12F, the optical add-drop device 2 processes a WDM signal with four wavelength channels. However, embodiments of the invention are not limited to this configuration. In particular, the optical add-drop device 2 can process a WDM signal with an arbitrary number of wavelength channels. However, when a number of wavelength channels is $2^n$ (n is an arbitrary natural number), the optical add-drop device 2 can process the WDM signal efficiently.

For example, the optical add-drop device 2 may include one optical circuit 10 to process two-wavelength WDM signals. Alternatively, the optical add-drop device 2 may include three optical circuits 10 to process eight-wavelength WDM signals. Similarly, the optical add-drop device 2 may include n optical circuits 10 to process $2^n$-wavelength WDM signals.

FIG. 13 illustrates an example of an optical add-drop device processing an eight-wavelength WDM signal. An optical add-drop device 2X includes three optical circuits 10 (10a-10c) for processing an eight-wavelength WDM signal. As depicted in FIG. 13, the optical circuits 10a-10c are coupled in series or cascade.

The optical circuit 10a includes sub optical circuits 11a-13a. A phase shifter provided in each of the sub optical circuits 11a-13a has a path length difference of 2ΔL. When each of the sub optical circuits 11a-13a includes, as depicted in FIG. 4B, a plurality of phase shifters, a smallest path length difference among the plurality of phase shifters of each of the sub optical circuits 11a-13a is 2ΔL. Thus, the cycle of the transmission property of each of the sub optical circuits 11a-13b is 2Δλ. Note that Δλ indicates a spacing between optical signals in the WDM signal.

The optical circuit 10b includes sub optical circuits 11b-13b. A phase shifter provided in each of the sub optical circuits 11b-13b has a path length difference of ΔL. When each of the sub optical circuits 11b-13b includes a plurality of phase shifters, a smallest path length difference among the plurality of phase shifters of each of the sub optical circuits 11b-13b is ΔL. Thus, the cycle of the transmission property of each of the sub optical circuits 11b-13b is 4ΔΛ.

The optical circuit 10c includes sub optical circuits 11c-13c. A phase shifter provided in each of the sub optical circuits 11c-13c has a path length difference of ΔL/2. When each of the sub optical circuits 11c-13c includes a plurality of phase shifters, a smallest path length difference among the plurality of phase shifters of each of the sub optical circuits 11c-13c is ΔL/2. Thus, the cycle of the transmission property of each of the sub optical circuits 11c-13c is 8ΔΛ.

The input port and the through port of the optical add-drop device 2X are respectively optically coupled to the sub optical circuit 11a and the sub optical circuit 13a. The drop port and the add port of the optical add-drop device 2X are respectively optically coupled to the sub optical circuit 12c and the sub optical circuit 13c. The output port of the sub optical circuit 12a is optically coupled to the input port of the sub optical circuit 11b, and the output port of the sub optical circuit 12b is optically coupled to the input port of the sub optical circuit 11c. The output port of the sub optical circuit 13c is optically coupled to the input port of the sub optical circuit 13b, and the output port of the sub optical circuit 13b is optically coupled to the input port of the sub optical circuit 13a. Accordingly, the optical circuit 10b is optically coupled between the optical circuit 10a to which the input port and the through port are connected and the optical circuit 10c to which the drop port and the add port are connected.

Figure 14:
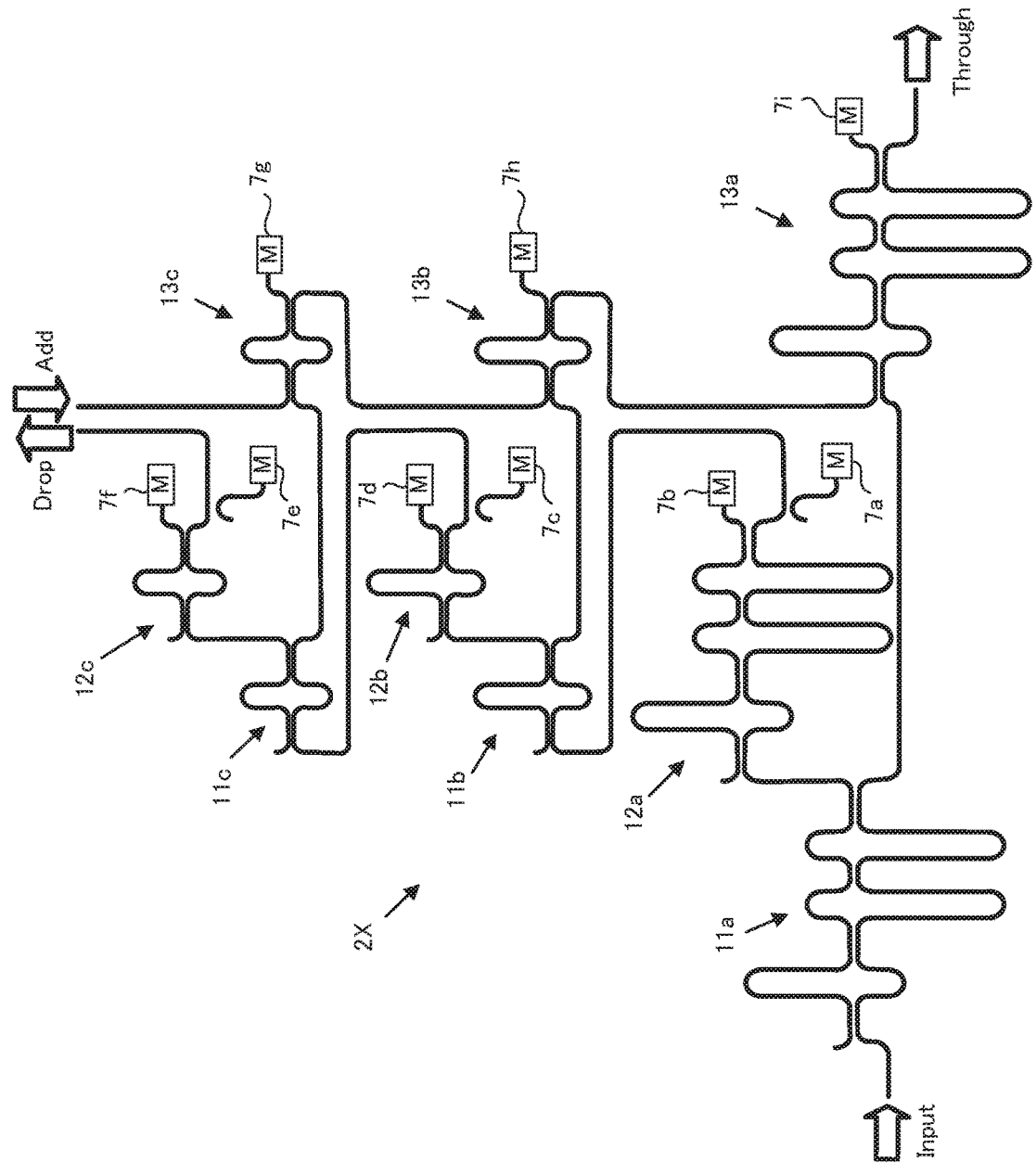
FIG. 14 illustrates an example of an optical add-drop device depicted in FIG. 13.

FIG. 14 illustrates an example of the optical add-drop device 2X depicted in FIG. 13. "M" in FIG. 14 indicates an optical monitor that monitors optical power. Note that the heaters and the controllers for adjusting the path length differences in the phase shifters are omitted in FIG. 14 for simplicity. Operations of the sub optical circuits in the optical add-drop device 2X depicted in FIG. 14 are substantially the same as those of the corresponding sub optical circuits in the optical add-drop device 2 described above with reference to FIGS. 3-12F.

In the sub optical circuit 11a, currents through the heaters provided in the vicinity of the phase shifters are controlled to adjust the path length differences in the phase shifters, thereby increasing optical power detected by an optical monitor 7a. In the sub optical circuit 12a, currents through the heaters provided in the vicinity of the phase shifters are controlled to adjust the path length differences in the phase shifters, thereby decreasing optical power detected by an optical monitor 7b.

In the sub optical circuit 11b, currents through the heaters provided in the vicinity of the phase shifters are controlled to adjust the path length differences in the phase shifters, thereby increasing optical power detected by an optical monitor 7c. In the sub optical circuit 12b, currents through the heaters provided in the vicinity of the phase shifters are controlled to adjust the path length differences in the phase shifters, thereby decreasing optical power detected by an optical monitor 7d.

In the sub optical circuit 11c, currents through the heaters provided in the vicinity of the phase shifters are controlled to adjust the path length differences in the phase shifters, thereby increasing optical power detected by an optical monitor 7e. In the sub optical circuit 12c, currents through the heaters provided in the vicinity of the phase shifters are controlled to adjust the path length differences in the phase shifters, thereby decreasing optical power detected by an optical monitor 7f.

In the sub optical circuit 13c, currents through the heaters provided in the vicinity of the phase shifters are controlled to adjust the path length differences in the phase shifters, thereby decreasing optical power detected by an optical monitor 7g. In the sub optical circuit 13b, currents through the heaters provided in the vicinity of the phase shifters are controlled to adjust the path length differences in the phase shifters, thereby decreasing optical power detected by an optical monitor 7h. In the sub optical circuit 13a, currents through the heaters provided in the vicinity of the phase shifters are controlled to adjust the path length differences in the phase shifters, thereby decreasing optical power detected by an optical monitor 7i.

Figure 15A:
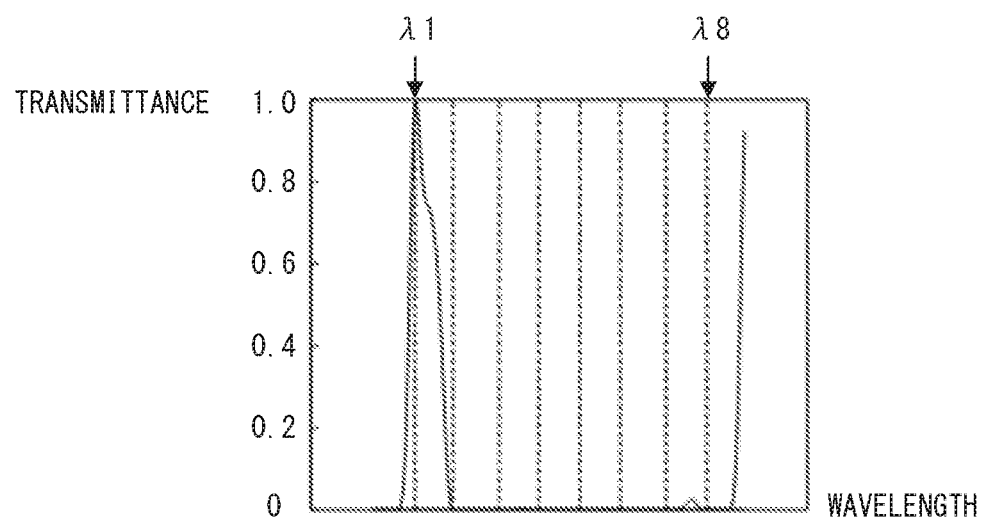
FIGS. 15A-15C illustrate simulation results of transmission spectra of an optical add-drop device depicted in FIGS. 13-14.
Figure 15B:
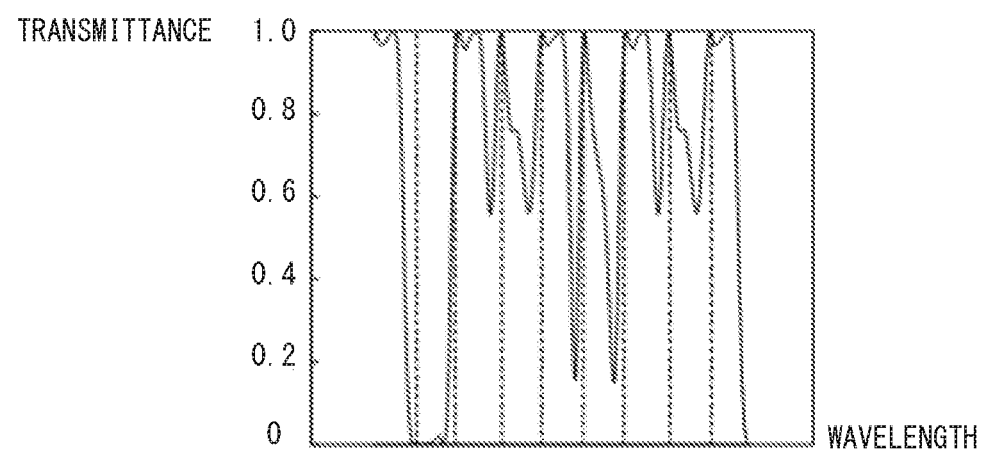
Figure 15C:
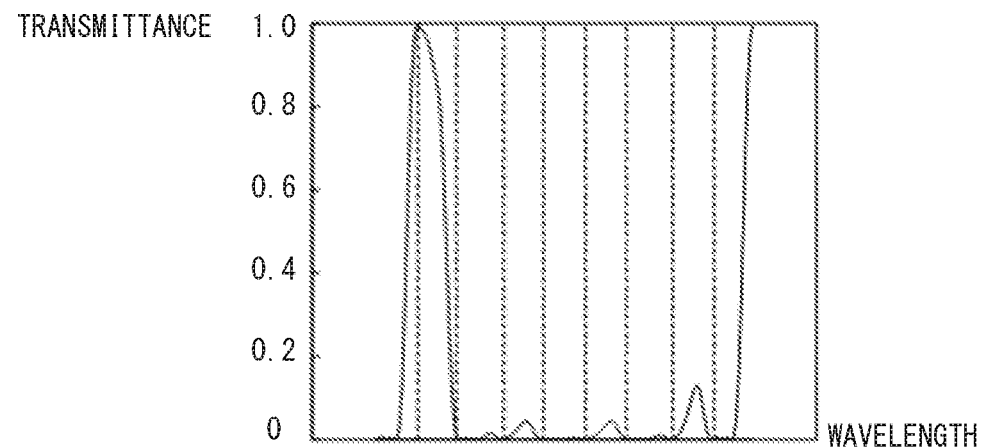

FIGS. 15A-15C illustrate simulation results of transmission spectra of the optical add-drop device 2X depicted in FIGS. 13-14. FIG. 15A depicts a transmission spectrum between the input port and the drop port. FIG. 15B depicts a transmission spectrum between the input port and the through port. FIG. 15C depicts a transmission spectrum between the add port and the through port. Note that these transmission spectra indicate states achieved after the path length differences in the phase shifters are adjusted using the method described above.

According to the transmission spectrum depicted in FIG. 15A, an optical signal of wavelength λ1 is guided from the input port to the drop port. That is, the optical signal of wavelength λ1 is dropped. According to the transmission spectrum depicted in FIG. 15B, optical signals of wavelengths λ2-λ8 are guided from the input port to the through port. According to the transmission spectrum depicted in FIG. 15C, an optical signal of wavelength λ1 is guided from the add port to the through port. That is, the optical signal of wavelength λ1 is added.

Figure 16:
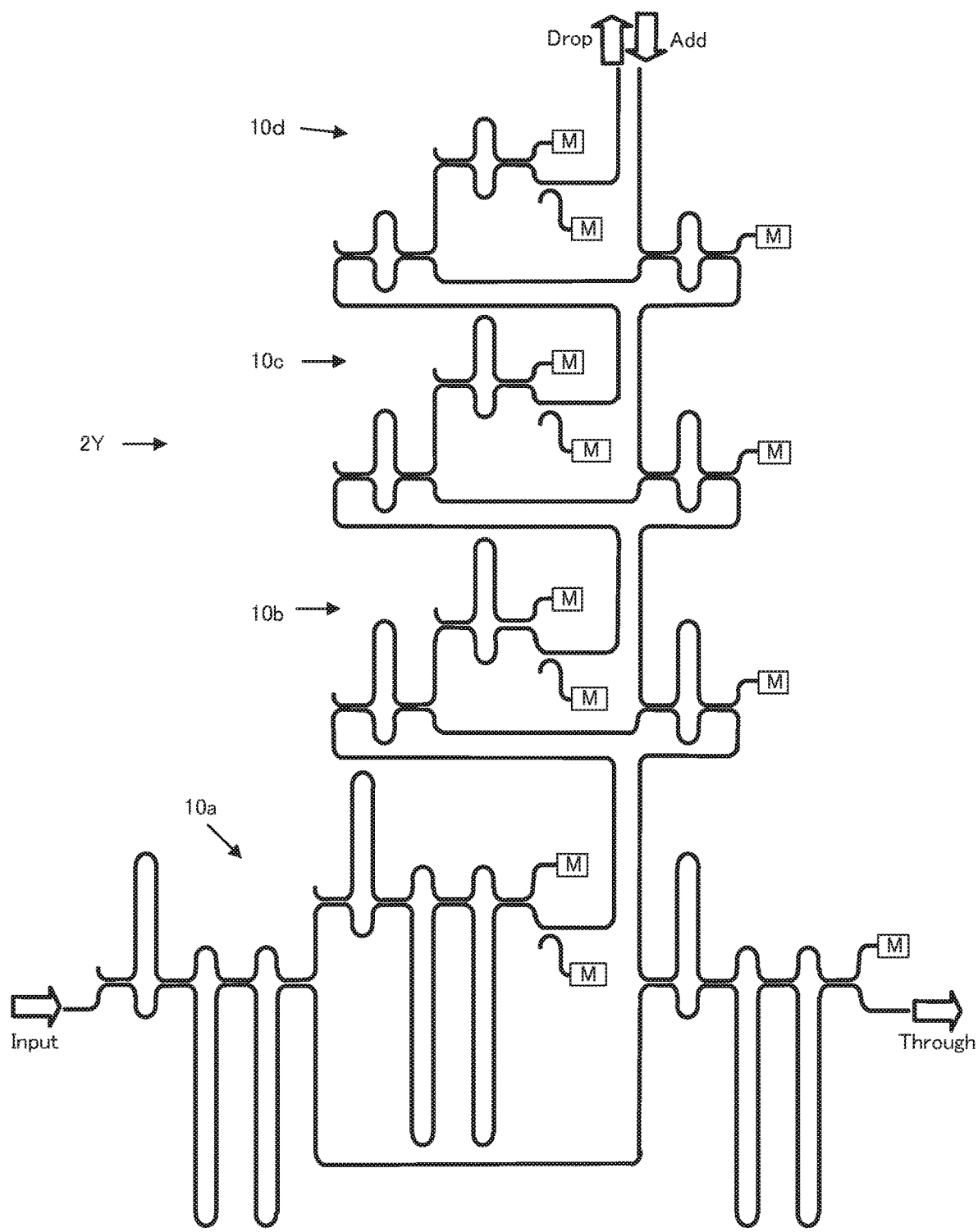
FIG. 16 illustrates an example of an optical add-drop device that processes a sixteen-wavelength WDM signal.

FIG. 16 illustrates an example of an optical add-drop device processing a sixteen-wavelength WDM signal. When processing a WDM signal with 16 wavelength channels, an optical add-drop device 2Y includes four optical circuits 10 (10a-10d) coupled in series or cascade. Thus, when processing a WDM signal with $2^n$ wavelength channels, the optical add-drop device includes n optical circuits 10 coupled in series or cascade.

As in the configurations depicted in FIGS. 3 and 13, each of the optical circuits 10 includes three sub optical circuits. Each sub optical circuit includes one or more phase shifters, as depicted in FIGS. 4A and 4B. Each sub optical circuit adjusts the path length difference in a corresponding phase shifter according to optical power detected by a corresponding optical monitor.

Figure 17A:
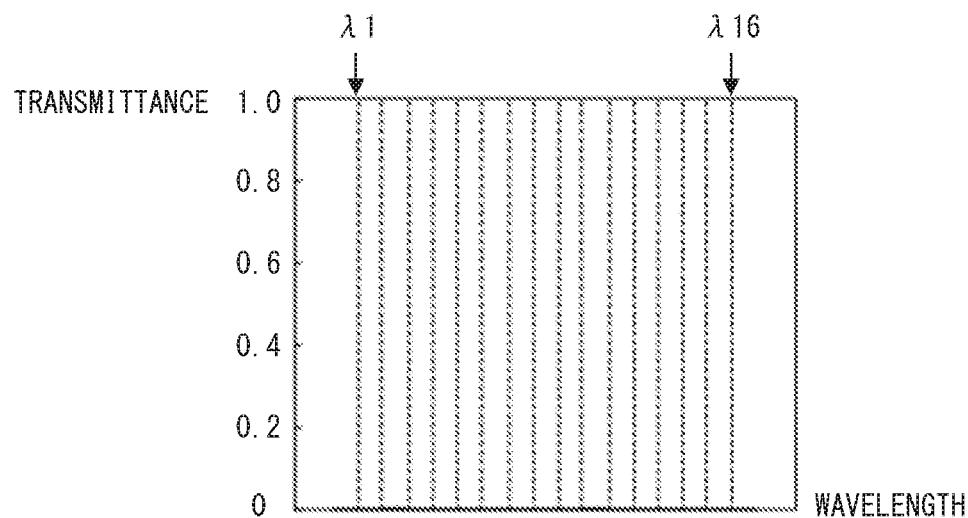
FIGS. 17A-17C illustrate simulation results of transmission spectra before adjustment of a phase shifter.
Figure 17B:
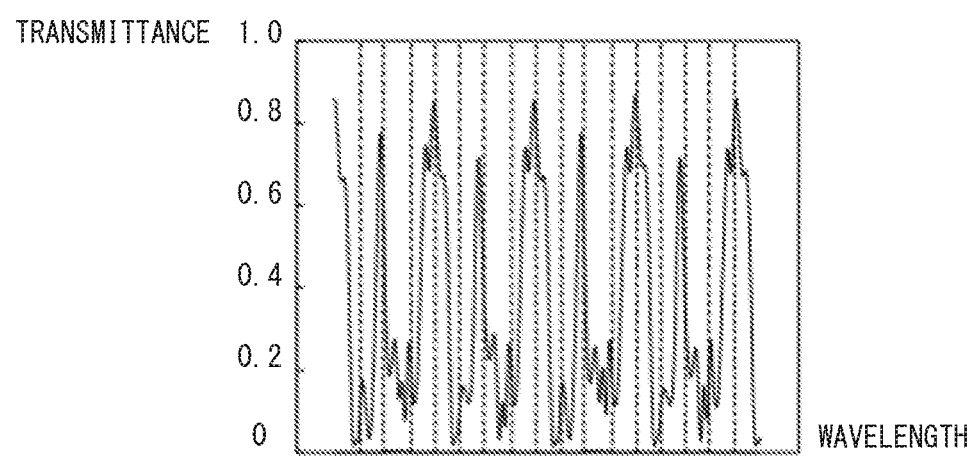
Figure 17C:
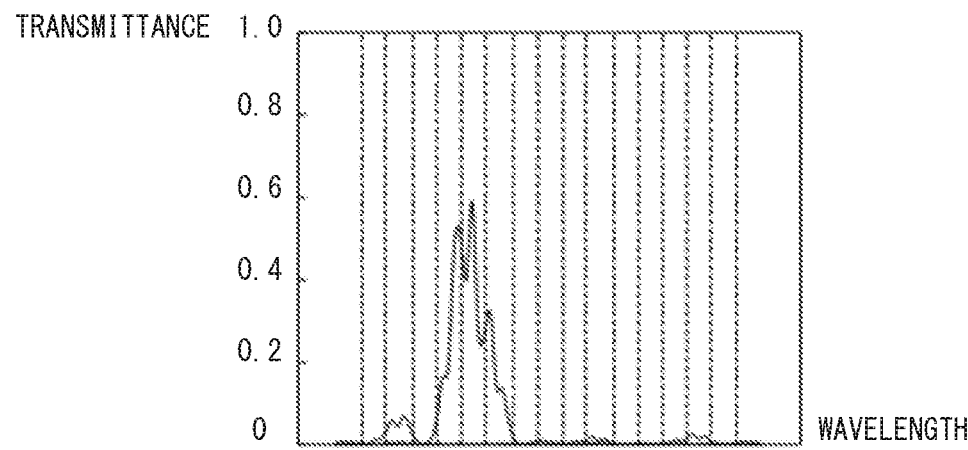
Figure 18A:
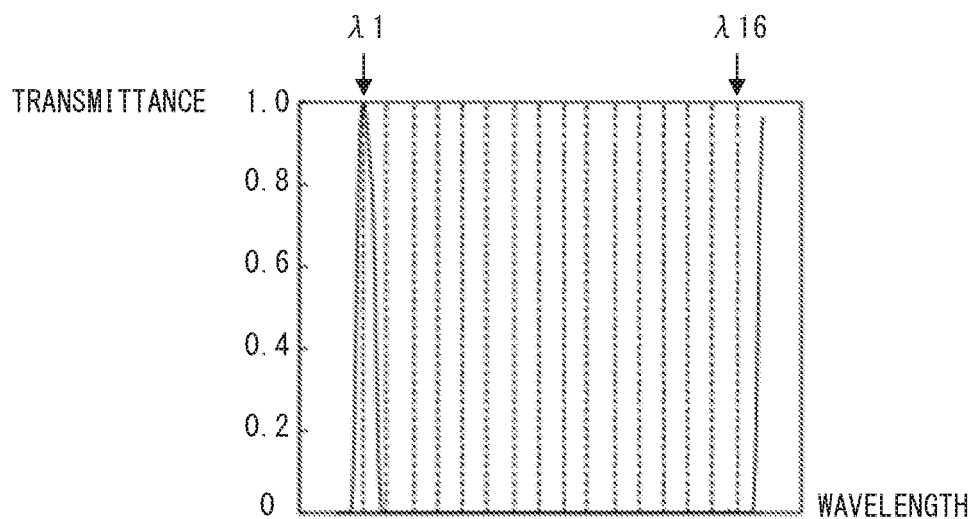
FIGS. 18A-18C illustrate simulation results of transmission spectra after adjustment of a phase shifter.
Figure 18B:
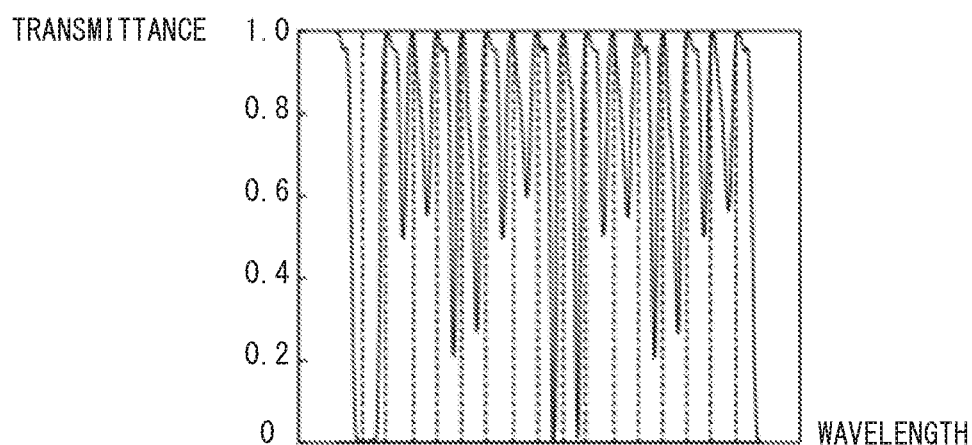
Figure 18C:
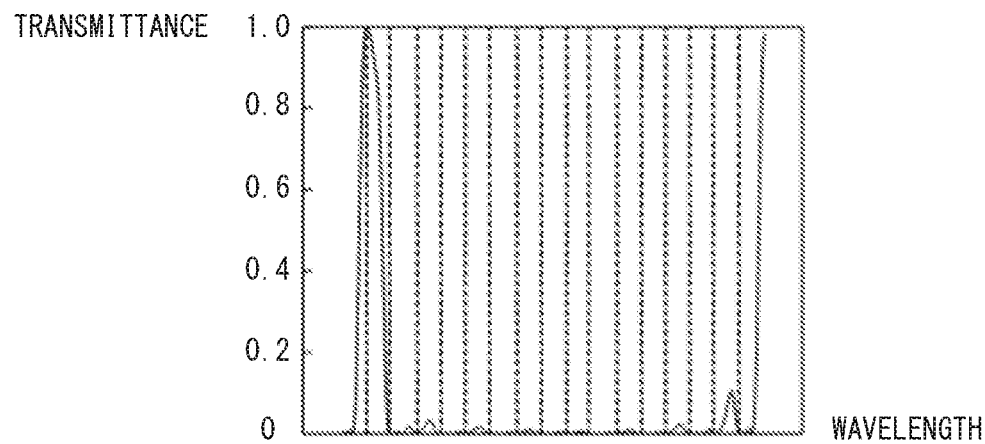

FIGS. 17A-18C illustrate simulation results of transmission spectra of the optical add-drop device 2Y depicted in FIG. 16. FIGS. 17A-17C depict states achieved before the path length differences in the phase shifters are adjusted. FIGS. 18A-18C depict states achieved after the path length differences in the phase shifters are adjusted. FIGS. 17A and 18A depict transmission spectra between the input port and the drop port. FIGS. 17B and 18B depict transmission spectra between the input port and the through port. FIGS. 17C and 18C depict a transmission spectrum between the add port and the through port.

According to the transmission spectrum depicted in FIG. 18A, an optical signal of wavelength λ1 is guided from the input port to the drop port. That is, the optical signal of wavelength λ1 is dropped. According to the transmission spectrum depicted in FIG. 18B, optical signals of wavelengths λ2-λ16 are guided from the input port to the through port. According to the transmission spectrum depicted in FIG. 18C, an optical signal of wavelength λ1 is guided from the add port to the through port. That is, the optical signal of wavelength λ1 is added.

Other Embodiments

In the example depicted in FIG. 3, the optical add-drop device includes two optical circuits to process four-wavelength WDM signal. In the example depicted in FIG. 16, the optical add-drop device includes three optical circuits to process eight-wavelength WDM signal. However, the present invention is not limited to these configurations. In particular, the optical add-drop device may include one or more optical circuits. An optical add-drop device that includes n optical circuits may process $2^n$-wavelength WDM signal.

In the examples described above, each sub optical circuit in an optical circuit to which the input port and the through port are connected includes a plurality of phase shifters. However, the invention is not limited to this configuration. In particular, each sub optical circuit in an optical circuit to which the input port and the through port are connected may include a single phase shifter. Meanwhile, each sub optical circuit in another optical circuit may include a plurality of phase shifters.

In the examples described above, wavelength channels multiplexed into a WDM signal are arranged at equal spacing. When the number of wavelength channels of a WDM signal is $2^n$, the optical add-drop device includes n optical circuits. However, the number of wavelength channels of the WDM signal does not need to be $2^n$. When the number of wavelength channels of a WDM signal is larger than $2^n$ and lower than or equal to $2^{n+1}$, the optical add-drop device preferably includes (n+1) optical circuits. When wavelength channels multiplexed into a WDM signal are not arranged at equal spacing, the relationship between the number of wavelength channels of the WDM signal and the number of optical circuits is not limited to the described relationships.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical add-drop device, comprising
   one or more optical circuits, each of the one or more optical circuits including
   a first sub optical circuit,
   a second sub optical circuit, and
   a third sub optical circuit,
   each of the first sub optical circuit, the second sub optical circuit and the third sub optical circuit including
   an input coupler,
   an output coupler, and
   a phase shifter, implemented between the input coupler and the output coupler, configured to provide a controllable amount of phase shift, and
   in each of the one or more optical circuits,
   a first port of the output coupler in the first sub optical circuit is optically coupled to the input coupler in the second sub optical circuit,
   a second port of the output coupler in the first sub optical circuit is optically coupled to a second port of the input coupler in the third sub optical circuit,
   the output coupler in the second sub optical circuit is optically coupled to an output port of the optical circuit,
   a first port of the input coupler in the third sub optical circuit is optically coupled to an input port of the optical circuit,
   a wavelength channel in a wavelength division multiplexed (WDM) signal that is input to the first sub optical circuit is guided to the output port of the optical circuit via the second sub optical circuit, and another wavelength channel in the WDM signal is guided to the third sub optical circuit, and
   the third sub optical circuit combines the other wavelength channel that is guided from the first sub optical circuit and a wavelength channel that is guided from the input port of the optical circuit.

2. The optical add-drop device according to claim 1, wherein
   each of the input couplers implemented in the first and second sub optical circuits is a 2×2 coupler or a 1×2 coupler,
   the input coupler implemented in the third sub optical circuit is a 2×2 coupler, and
   each of the output couplers implemented in the first to third sub optical circuits is a 2×2 coupler.

3. The optical add-drop device according to claim 1, wherein
   when the optical add-drop device includes a plurality of optical circuits, the plurality of optical circuits are coupled in series,
   the output port of each of the optical circuits is optically coupled to the input coupler in the first sub optical circuit in the optical circuit in a subsequent stage,
   the output port of the optical circuit in a last stage is optically coupled to a drop port of the optical add-drop device,
   the input port of each of the optical circuits is optically coupled to the output coupler in the third sub optical circuit in the optical circuit in the subsequent stage, and
   the input port of the optical circuit in the last stage is optically coupled to an add port of the optical add-drop device.

4. An optical add-drop device comprising:
   an input port;
   a through port;
   a drop port;
   an add port;
   a first optical circuit; and
   a second optical circuit,
   wherein each of the first optical circuit and the second optical circuit includes
   a first sub optical circuit,
   a second sub optical circuit, and
   a third sub optical circuit,
   wherein each of the first sub optical circuit, the second sub optical circuit and the third sub optical circuit includes
   an input coupler,
   an output coupler, and
   a phase shifter, implemented between the input coupler and the output coupler, configured to provide a controllable amount of phase shift, the input port is optically coupled to the input coupler in the first sub optical circuit in the first optical circuit, the through port is optically coupled to the output coupler in the third sub optical circuit in the first optical circuit, the drop port is optically coupled to the output coupler in the second sub optical circuit in the second optical circuit, the add port is optically coupled to a first port of the input coupler in the third sub optical circuit in the second optical circuit, in each of the first optical circuit and the second optical circuit,
- a first port of the output coupler in the first sub optical circuit is optically coupled to the input coupler in the second sub optical circuit,
- a second port of the output coupler in the first sub optical circuit is optically coupled to a second port of the input coupler in the third sub optical circuit, the output coupler in the second sub optical circuit in the first optical circuit is optically coupled to the input coupler in the first sub optical circuit in the second optical circuit, and the output coupler in the third sub optical circuit in the second optical circuit is optically coupled to a first port of the input coupler in the third sub optical circuit in the first optical circuit.

5. The optical add-drop device according to claim 4, wherein
the first optical circuit includes
- a first optical monitor that detects output optical power of the second sub optical circuit,
- a second optical monitor that detects output optical power of the third sub optical circuit, and
- a first controller that controls the phase shifters implemented in the first optical circuit according to a first monitor value obtained by the first optical monitor and a second monitor value obtained by the second optical monitor, and the first controller controls, according to the first monitor value, the phase shifter implemented in the first sub optical circuit and the phase shifter implemented in the second sub optical circuit so as to increase power of light guided from the second sub optical circuit in the first optical circuit to the second optical circuit and controls, according to the second monitor value, the phase shifter implemented in the third sub optical circuit so as to increase power of light guided from the third sub optical circuit in the first optical circuit to the through port.

6. The optical add-drop device according to claim 4, wherein
the second optical circuit includes
- a third optical monitor that detects output optical power of the second sub optical circuit,
- a fourth optical monitor that detects output optical power of the third sub optical circuit, and
- a second controller that controls the phase shifters implemented in the second optical circuit according to a third monitor value obtained by the third optical monitor and a fourth monitor value obtained by the fourth optical monitor, and the second controller controls, according to the third monitor value, the phase shifter implemented in the first sub optical circuit and the phase shifter implemented in the second sub optical circuit so as to increase power of light guided from the second sub optical circuit of the second optical circuit to the drop port and controls, according to the fourth monitor value, the phase shifter implemented in the third sub optical circuit so as to increase power of light guided from the third sub optical circuit in the second optical circuit to the first optical circuit.

7. The optical add-drop device according to claim 4, wherein a cycle of a transmission property of each of the first to third sub optical circuits in the second optical circuit is twice a cycle of a transmission property of each of the first to third sub optical circuits in the first optical circuit.

8. The optical add-drop device according to claim 7, wherein the cycle of the transmission property of each of the first to third sub optical circuits in the first optical circuit is twice a spacing of wavelength channels of a WDM signal input to the first optical circuit via the input port.

9. The optical add-drop device according to claim 4, further comprising: one or more optical circuits located between the first optical circuit and the second optical circuit and having a same structure as the second optical circuit.

10. The optical add-drop device according to claim 9, wherein a cycle of a transmission property of each of the first to third sub optical circuits in an optical circuit that is m-th closest to the first optical circuit among the one or more optical circuits is 2m times a cycle of a transmission property of each of the first to third sub optical circuits in the first optical circuit.

11. The optical add-drop device according to claim 4, wherein each of the phase shifters included in the first sub optical circuit in the first optical circuit, the second sub optical circuit in the first optical circuit, the first sub optical circuit in the second optical circuit, and the second sub optical circuit in the second optical circuit is adjusted under a condition in which only an optical signal of a wavelength to be dropped from a WDM signal is entering the input port.

12. The optical add-drop device according to claim 4, wherein each of the phase shifters included in the third sub optical circuit in the second optical circuit and the third sub optical circuit in the first optical circuit is adjusted under a condition in which only an optical signal of a wavelength to be added to a WDM signal is entering the add port.

13. The optical add-drop device according to claim 4, wherein
each of the first sub optical circuit, the second sub optical circuit and the third sub optical circuit includes
- N 2×2 couplers that include the input coupler and the output coupler, and
- (N-1) phase shifters, each of the phase shifters is implemented between two 2×2 couplers of the N 2×2 couplers, and each of the phase shifters includes a pair of optical waveguides.

14. An information processing device, comprising:
a calculator; and
an optical add-drop device connected to the calculator, the optical add-drop device including
- an input port,
- a through port,
- a drop port,
- an add port,
- a first optical circuit, and
- a second optical circuit, wherein each of the first optical circuit and the second optical circuit includes
- a first sub optical circuit,
- a second sub optical circuit, and
- a third sub optical circuit, wherein each of the first sub optical circuit, the second sub optical circuit and the third sub optical circuit includes
an input coupler,
an output coupler, and
a phase shifter implemented between the input coupler and the output coupler, an amount of a phase shift of the phase shifter being controllable, the input port is optically coupled to the input coupler in the first sub optical circuit in the first optical circuit, the through port is optically coupled to the output coupler in the third sub optical circuit in the first optical circuit, the drop port is optically coupled to the output coupler in the second sub optical circuit in the second optical circuit, the add port is optically coupled to a first port of the input coupler in the third sub optical circuit in the second optical circuit, in each of the first optical circuit and the second optical circuit,
a first port of the output coupler in the first sub optical circuit is optically coupled to the input coupler in the second sub optical circuit, and
a second port of the output coupler in the first sub optical circuit is optically coupled to a second port of the input coupler in the third sub optical circuit, the output coupler in the second sub optical circuit in the first optical circuit is optically coupled to the input coupler in the first sub optical circuit in the second optical circuit, and the output coupler in the third sub optical circuit in the second optical circuit is optically coupled to an input port of the input coupler in the third sub optical circuit in the first optical circuit, and the optical add-drop device drops an optical signal of a specified wavelength from a WDM signal entering via the input port and guides the dropped optical signal to the calculator via the drop port, and adds an optical signal entering from the calculator via the add port to the WDM signal and outputs the resultant signal via the through port.

* * * * *